United States Patent
Ono et al.

(10) Patent No.: US 11,524,261 B2
(45) Date of Patent: Dec. 13, 2022

(54) SYSTEM FOR TREATING TETRAALKYLAMMONIUM HYDROXIDE-CONTAINING LIQUID AND METHOD FOR TREATING SAME

(71) Applicant: ORGANO CORPORATION, Tokyo (JP)

(72) Inventors: Yoshinori Ono, Tokyo (JP); Hiroki Narita, Tokyo (JP); Shohei Mizuma, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 0 days.

(21) Appl. No.: 17/286,114

(22) PCT Filed: Sep. 13, 2019

(86) PCT No.: PCT/JP2019/036092
§ 371 (c)(1),
(2) Date: Apr. 16, 2021

(87) PCT Pub. No.: WO2020/080008
PCT Pub. Date: Apr. 23, 2020

(65) Prior Publication Data
US 2021/0370234 A1 Dec. 2, 2021

(30) Foreign Application Priority Data
Oct. 19, 2018 (JP) .............................. JP2018-197694

(51) Int. Cl.
*B01D 61/02* (2006.01)
*B01D 61/08* (2006.01)
(Continued)

(52) U.S. Cl.
CPC ......... *B01D 61/026* (2022.08); *B01D 61/025* (2013.01); *B01D 61/027* (2013.01);
(Continued)

(58) Field of Classification Search
CPC ................ B01D 61/022; B01D 61/025; B01D 2317/022; C02F 1/048; C02F 2103/346; C02F 9/00
See application file for complete search history.

(56) References Cited

U.S. PATENT DOCUMENTS

| 5,874,204 A | 2/1999 | Sugawara et al. |
| 6,083,670 A | 7/2000 | Sugawara et al. |

(Continued)

FOREIGN PATENT DOCUMENTS

| CN | 1491900 A | 4/2004 |
| JP | 60-118282 A | 6/1985 |

(Continued)

OTHER PUBLICATIONS

Rautenbach, R., T. Linn, and L. Eilers. "Treatment of severely contaminated waste water by a combination of RO, high-pressure RO and NF—potential and limits of the process." Journal of Membrane Science 174.2 (2000): 231-241. (Year: 2000).*

(Continued)

*Primary Examiner* — Bradley R Spies
(74) *Attorney, Agent, or Firm* — Greenblum & Bernstein, P.L.C.

(57) ABSTRACT

A system for treating a tetraalkylammonium hydroxide-containing liquid having a high-pressure type reverse osmosis membrane device concentrating a liquid to be treated containing tetraalkylammonium hydroxide at a concentration side, and a line for supplying the concentrated liquid to be treated by the reverse osmosis membrane device to an evaporator further concentrating the concentrated liquid to be treated.

4 Claims, 8 Drawing Sheets

(51) Int. Cl.
- B01D 65/02 (2006.01)
- C02F 1/04 (2006.01)
- C02F 1/44 (2006.01)
- C02F 9/00 (2006.01)
- C02F 103/34 (2006.01)

(52) U.S. Cl.
CPC ............ *B01D 61/08* (2013.01); *B01D 65/02* (2013.01); *C02F 9/00* (2013.01); *B01D 2311/02* (2013.01); *B01D 2311/25* (2013.01); *B01D 2311/2673* (2013.01); *B01D 2313/10* (2013.01); *B01D 2313/12* (2013.01); *B01D 2317/022* (2013.01); *B01D 2321/12* (2013.01); *B01D 2321/164* (2013.01); *C02F 1/048* (2013.01); *C02F 1/441* (2013.01); *C02F 1/442* (2013.01); *C02F 2103/346* (2013.01); *C02F 2301/046* (2013.01); *C02F 2303/16* (2013.01)

(56) References Cited

U.S. PATENT DOCUMENTS

| 6,187,519 | B1 | 2/2001 | Sugawara |
|---|---|---|---|
| 2001/0003481 | A1 | 6/2001 | Sugawara |

FOREIGN PATENT DOCUMENTS

| JP | 63-294989 A | 12/1988 |
|---|---|---|
| JP | 6142697 A | 5/1994 |
| JP | 11-77089 A | 3/1999 |
| JP | 11-192481 A | 7/1999 |
| JP | 2000-138150 A | 5/2000 |
| JP | 2000-155426 A | 6/2000 |
| JP | 2000-225324 A | 8/2000 |
| JP | 2001-276824 A | 10/2001 |
| JP | 2003-053328 A | 2/2003 |
| JP | 2003-215810 A | 7/2003 |
| JP | 2007-098272 A | 4/2007 |
| JP | 2010-36094 A | 2/2010 |
| JP | 2012-192367 A | 10/2012 |
| JP | 2012-210565 A | 11/2012 |
| JP | 2012-210566 A | 11/2012 |
| JP | 2012-210568 A | 11/2012 |
| JP | 2018-065726 A | 4/2018 |
| JP | 2018-094526 A | 6/2018 |
| JP | 2018-153789 A | 10/2018 |
| WO | 2010/061811 A1 | 6/2010 |

OTHER PUBLICATIONS

Mericq, Jean-Pierre, Stéphanie Laborie, and Corinne Cabassud. "Vacuum membrane distillation of seawater reverse osmosis brines." Water research 44.18 (2010): 5260-5273. (Year: 2010).*

Davenport, Douglas M., et al. "High-pressure reverse osmosis for energy-efficient hypersaline brine desalination: current status, design considerations, and research needs." Environmental Science & Technology Letters 5.8 (2018): 467-475. (Year: 2018).*

Kofune Keiryo et al—JP 2012210566 A Machine Translation—2012 (Year: 2012).*

Chifuku Hiroyuki et al—JP 2007098272 A machine translation—2007 (Year: 2007).*

Sugawara Hiroshi—JP 2001276824 A machine translation—2001 (Year: 2001).*

International Search Report issued in International Patent Application No. PCT/JP2019/036092, dated Dec. 10, 2019, along with English translation thereof.

Written Opinion of the International Searching Authority issued in International Patent Application No. PCT/JP2019/036092, dated Dec. 10, 2019, along with English translation thereof.

Chinese Office Action in counterpart Chinese Application No. 201980064496.X dated Jul. 5, 2022, along with English translation thereof.

* cited by examiner

SYSTEM FOR TREATING TETRAALKYLAMMONIUM HYDROXIDE-CONTAINING LIQUID AND METHOD FOR TREATING SAME

TECHNICAL FIELD

The present invention relates to a system for treating a tetraalkylammonium hydroxide-containing liquid and a method for treating the same.

BACKGROUND ART

In a photolithographic process in the field of manufacturing semiconductor apparatuses such as semiconductor devices and liquid crystal displays, a positive photoresist (hereinafter, also simply referred to as a resist) is mainly used. As a developer for this, a solution containing tetraalkylammonium hydroxide (TAAH) (TAAH developer) is used in many cases. As TAAH, tetramethylammonium hydroxide (TMAH) is generally used.

In a method of using a TMAH developer, a resist is applied onto a substrate to form a resist film, the resist film is exposed via a photomask, and thereby an alkaline solution soluble resist part is produced. This part is dissolved and removed by a high alkaline TMAH developer (development step) to produce a resist pattern. Generally, a TMAH aqueous solution having a TMAH concentration of 2.38% by mass is used as the TMAH developer.

In the case of a positive resist, by the development step, solubility of the exposed portion with respect to the TMAH developer is increased so that the exposed portion becomes soluble and is removed, and the resist of the unexposed portion remains as the resist pattern. Thereafter, the TMAH developer which has been reacted with the resist on the substrate is washed with pure water or the like. As a result, the development waste becomes a mixed liquid of TMAH of the developer, the dissolved resist, and water.

Since TMAH is specified as a poisonous material, an effluent treatment becomes essential, and countermeasures thereof in plants have been underway. As described above, demand of a treatment for a photoresist-containing development waste containing TMAH (hereinafter, also referred to as the development waste) and importance of the treatment therefor have been increasing. In some plants, the development waste is concentrated using an evaporator to reduce the volume, and is outsourced as an industrial waste treatment or valuable substance recovery. Furthermore, TMAH is also recovered and then reused by a biotreatment, a treatment using electrodialysis (ED) and a resin (for example, an ion exchange resin), or the like.

Furthermore, a technique of supplying under pressure a TMAH-containing effluent to a reverse osmosis (RO) membrane and concentrating the TMAH-containing effluent (see Patent Literature 1) and a technique of treating a photoresist development waste containing a photoresist and TMAH using a nanofiltration (NF) membrane to separate the photoresist development waste into the photoresist at a concentration side and TMAH at a permeation side (see Patent Literature 2) have been known.

CITATION LIST

Patent Literatures

Patent Literature 1: JP-A-60-118282 ("JP-A" means an unexamined published Japanese patent application)
Patent Literature 2: JP-A-11-192481

SUMMARY OF INVENTION

Technical Problem

In recent years, an increase in the number of development steps, necessity of treatment of TAAH effluent even if a trace amount of TAAH is contained, or the like makes the treatment amount of TAAH waste to increase, and thus the concentration treatment amount using an evaporator increases. For this reason, the concentrating capability of the already-existing evaporator is insufficient, and measures against this problem are needed.

In the case of performing concentration of development waste such as a TAAH-containing liquid using a separation membrane, clogging (blocking) of the membrane due to the resist becomes problematic. If the clogging of the membrane occurs, it is necessary to exchange the membrane for a new membrane.

Furthermore, in recent years, a RO membrane having a high rejection rate (a high-pressure RO membrane or the like) is placed on the market, and by using this membrane, TAAH and the resist can be treated at a high rejection rate. However, in the high-pressure RO membrane, blocking of the membrane due to the resist becomes problematic more than conventional RO (intermediate-pressure to ultralow-pressure RO) membranes.

The present invention provides a system for treating a TAAH-containing liquid and a method for treating a TAAH-containing liquid which can reduce a concentration load applied to an evaporator and treat the TAAH-containing liquid without additionally providing evaporators even when the TAAH-containing liquid is increased. In addition, the present invention also provides a system for treating a TAAH-containing liquid and a method for treating a TAAH-containing liquid which can recover a RO membrane, which is used as a means for reducing a concentration load applied to an evaporator, from a decline state of treatment capacity or a treatment-unable state caused by clogging due to the resist dissolved in the developer.

Solution to Problem

The above-described problems of the present invention have been solved by the following means.

[1]
A system for treating a tetraalkylammonium hydroxide-containing liquid, having:
a high-pressure type reverse osmosis membrane device concentrating a liquid to be treated containing tetraalkylammonium hydroxide at a concentration side; and
a line for supplying the concentrated liquid to be treated by the reverse osmosis membrane device to an evaporator further concentrating the concentrated liquid to be treated.

[2]
The system for treating a tetraalkylammonium hydroxide-containing liquid described in [1], having a washing system washing the reverse osmosis membrane device with a washing liquid containing tetraalkylammonium hydroxide.

[3]
The system for treating a tetraalkylammonium hydroxide-containing liquid described in [1] or [2],
in which a part of the system for treating a tetraalkylammonium hydroxide-containing liquid is capable of being used as a circulation system configured by including the reverse osmosis membrane device, and in which the circulation system is usable as a washing system washing a reverse osmosis membrane of the reverse osmosis membrane device by circulating a washing liquid containing tetraalkylammonium hydroxide in the circulation system.

[4]

The system for treating a tetraalkylammonium hydroxide-containing liquid described in [3], containing:

(a-1) a liquid tank retaining a tetraalkylammonium hydroxide-containing liquid, (b-1) a liquid supply pipe having one end connected to a liquid discharge side of the liquid tank, (c-1) a reverse osmosis membrane device connected to the other end of the liquid supply pipe, (d-1) a concentrated water pipe having one end connected to a concentration side of the reverse osmosis membrane device and supplying concentrated water of the reverse osmosis membrane device to an evaporator, (e-1) a concentrated water return pipe connected to the concentrated water pipe and supplying the concentrated water of the reverse osmosis membrane device to the liquid tank, (f-1) a permeated water pipe having one end connected to a permeation side of the reverse osmosis membrane device, (g-1) a dilute tetraalkylammonium hydroxide effluent treatment facility connected to the other end of the permeated water pipe, and (h-1) a permeated water return pipe connected to the permeated water pipe and supplying permeated water of the reverse osmosis membrane device to the liquid tank, in which the washing system is a system washing a reverse osmosis membrane of the reverse osmosis membrane device by supplying a virgin tetraalkylammonium hydroxide liquid to the liquid tank and circulating the virgin tetraalkylammonium hydroxide liquid in both circulation systems of a circulation system formed by the (a-1) to (d-1) and (e-1) and a circulation system formed by the (a-1) to (c-1), (f-1), and (h-1).

[5]

The system for treating a tetraalkylammonium hydroxide-containing liquid described in [3], containing:

(a-2) a liquid tank retaining a tetraalkylammonium hydroxide-containing liquid, (b-2) a liquid supply pipe having one end connected to a liquid discharge side of the liquid tank, (c-2) a reverse osmosis membrane device connected to the other end of the liquid supply pipe, (d-2) a concentrated water pipe having one end connected to a concentration side of the reverse osmosis membrane device and supplying concentrated water of the reverse osmosis membrane device to an evaporator, (e-2) a concentrated water return pipe connected to the concentrated water pipe and supplying the concentrated water of the reverse osmosis membrane device to the liquid tank, (f-2) a permeated water pipe having one end connected to a permeation side of the reverse osmosis membrane device, (g-2) a permeated water tank provided in the middle of the permeated water pipe, (h-2) a dilute tetraalkylammonium hydroxide effluent treatment facility connected to the other end of the permeated water pipe, and (i-2) a permeated water return pipe connected to the permeated water pipe positioned between the permeated water tank and the dilute tetraalkylammonium hydroxide effluent treatment facility and supplying permeated water of the reverse osmosis membrane device to the liquid tank, in which the washing system is a system washing a reverse osmosis membrane of the reverse osmosis membrane device by supplying a virgin tetraalkylammonium hydroxide liquid to the liquid tank and circulating the virgin tetraalkylammonium hydroxide liquid in both circulation systems of a circulation system formed by the (a-2) to (d-2) and (e-2) and a circulation system formed by the (a-2) to (c-2), (f-2), (g-2), and (i-2).

[6]

The system for treating a tetraalkylammonium hydroxide-containing liquid described in [3], containing:

(a-3) a liquid tank retaining a tetraalkylammonium hydroxide-containing liquid, (b-3) a liquid supply pipe having one end connected to a liquid discharge side of the liquid tank, (c-3) a reverse osmosis membrane device (Y) connected to the other end of the liquid supply pipe, (d-3) a concentrated water pipe having one end connected to a concentration side of the reverse osmosis membrane device and supplying concentrated water of the reverse osmosis membrane device to an evaporator, (e-3) a concentrated water return pipe connected to the concentrated water pipe and supplying the concentrated water of the reverse osmosis membrane device (Y) to the liquid tank, (f-3) a permeated water pipe (P) having one end connected to a permeation side of the reverse osmosis membrane device (Y), (g-3) a permeated water tank provided in the middle of the permeated water pipe (P), (h-3) a dilute tetraalkylammonium hydroxide effluent treatment facility connected to the other end of the permeated water pipe (P), (i-3) a permeated water return pipe (I) connected to the permeated water pipe (P) positioned between the reverse osmosis membrane device (Y) and the permeated water tank and supplying permeated water of the reverse osmosis membrane device (Y) to the liquid tank, (j-3) a permeated water-concentrated water tank provided in the middle of the permeated water return pipe (I), (k-3) another permeated water return pipe (II) diverged from the permeated water pipe (P) positioned between the permeated water tank and the dilute tetraalkylammonium hydroxide effluent treatment facility and connected to the permeated water return pipe (I) positioned between the reverse osmosis membrane device (Y) and the permeated water-concentrated water tank, (l-3) another reverse osmosis membrane device (Z) provided in the middle of the another permeated water return pipe (II), and (m-3) another permeated water pipe (Q) connecting a permeation side of the another reverse osmosis membrane device (Z) and the dilute tetraalkylammonium hydroxide effluent treatment facility, in which the washing system is a system washing a reverse osmosis membrane of the reverse osmosis membrane device by supplying concentrated water (X) obtained by concentrating permeated water of the reverse osmosis membrane device (Y) in the another reverse osmosis membrane device (Z) to the liquid tank and circulating the concentrated water (X) in both circulation systems of a circulation system formed by the (a-3) to (d-3) and (e-3) and a circulation system formed by the (a-3) to (c-3), (f-3), (i-3), and (j-3).

[7]

The system for treating a tetraalkylammonium hydroxide-containing liquid described in [3], containing:

(a-4) a liquid tank retaining a tetraalkylammonium hydroxide-containing liquid,
(b-4) a liquid supply pipe having one end connected to a liquid discharge side of the liquid tank,
(c-4) a reverse osmosis membrane device connected to the other end of the liquid supply pipe,
(d-4) a concentrated water pipe having one end connected to a concentration side of the reverse osmosis membrane device and supplying concentrated water of the reverse osmosis membrane device to an evaporator,
(e-4) a concentrated water tank provided in the middle of the concentrated water pipe,
(f-4) a concentrated water return pipe connected to the concentrated water pipe positioned between the reverse osmosis membrane device and the concentrated water tank and supplying the concentrated water of the reverse osmosis membrane device to the liquid tank,
(g-4) a concentrated water permeation pipe diverged from the concentrated water pipe positioned on the downstream side of the concentrated water tank and connected to the concentrated water return pipe,
(h-4) a nanofiltration membrane device provided in the middle of the concentrated water permeation pipe,
(i-4) a nanofiltration membrane permeated water tank provided in the middle of the concentrated water permeation pipe and retaining permeated water of the nanofiltration membrane device,
(j-4) a nanofiltration membrane concentrated water pipe having one end connected to a concentration side of the nanofiltration membrane device and supplying concentrated water of the nanofiltration membrane device to the evaporator,
(k-4) a permeated water pipe having one end connected to a permeation side of the reverse osmosis membrane device,
(l-4) a dilute tetraalkylammonium hydroxide effluent treatment facility connected to the other end of the permeated water pipe, and
(m-4) a permeated water return pipe connected to the permeated water pipe and supplying the permeated water to the liquid tank,
in which the washing system is a system washing a reverse osmosis membrane of the reverse osmosis membrane device by supplying a virgin tetraalkylammonium hydroxide liquid to the liquid tank and circulating the virgin tetraalkylammonium hydroxide liquid in both circulation systems of a circulation system formed by the (a-4) to (e-4) and (f-4) to (i-4) and a circulation system formed by the (a-4) to (c-4), (k-4), and (m-4).

[8]
The system for treating a tetraalkylammonium hydroxide-containing liquid described in [3], containing:
(a-5) a liquid tank retaining a tetraalkylammonium hydroxide-containing liquid,
(b-5) a liquid supply pipe having one end connected to a liquid discharge side of the liquid tank,
(c-5) a reverse osmosis membrane device (Y) connected to the other end of the liquid supply pipe,
(d-5) a concentrated water pipe having one end connected to a concentration side of the reverse osmosis membrane device and supplying concentrated water of the reverse osmosis membrane device to an evaporator,
(e-5) a concentrated water return pipe connected to the concentrated water pipe and supplying the concentrated water of the reverse osmosis membrane device (Y) to the liquid tank,
(f-5) a permeated water pipe (P) having one end connected to a permeation side of the reverse osmosis membrane device (Y),
(g-5) a permeated water tank provided in the middle of the permeated water pipe (P),
(h-5) a dilute tetraalkylammonium hydroxide effluent treatment facility connected to the other end of the permeated water pipe (P),
(i-5) a permeated water return pipe (I) connected to the permeated water pipe (P) positioned between the reverse osmosis membrane device (Y) and the permeated water tank and supplying permeated water of the reverse osmosis membrane device (Y) to the liquid tank,
(j-5) a permeated water-concentrated water tank provided in the middle of the permeated water return pipe (I),
(k-5) another permeated water return pipe (II) diverged from the permeated water pipe (P) positioned between the permeated water tank and the dilute tetraalkylammonium hydroxide effluent treatment facility and connected to the permeated water return pipe (I) positioned between the reverse osmosis membrane device (Y) and the permeated water-concentrated water tank,
(l-5) another reverse osmosis membrane device (Z) provided in the middle of the another permeated water return pipe (II),
(m-5) a nanofiltration membrane device provided in the middle of the another permeated water return pipe (II) and treating concentrated water of the another reverse osmosis membrane device (Z),
(n-5) another permeated water pipe (Q) connecting a permeation side of the another reverse osmosis membrane device (Z) and the dilute tetraalkylammonium hydroxide effluent treatment facility, and
(o-5) a nanofiltration membrane concentrated water pipe connecting a concentration side of the nanofiltration membrane device and the another permeated water pipe (Q),
in which the washing system is a system washing a reverse osmosis membrane of the reverse osmosis membrane device by supplying permeated water-treated water, which is obtained by concentrating permeated water of the reverse osmosis membrane device (Y) in the another reverse osmosis membrane device (Z) and further permeating the concentrated permeated water through the nanofiltration membrane device, to the liquid tank and circulating the permeated water-treated water in both circulation systems of a circulation system formed by the (a-5) to (d-5) and (e-5) and a circulation system formed by the (a-5) to (c-5), (f-5), and (i-5).

[9]
The system for treating a tetraalkylammonium hydroxide-containing liquid described in any one of [4] to [8], including:
a means for measuring a resist concentration of the washing liquid supplied from the liquid tank by the washing system; and
a washing state detection means for detecting a washing state from the measured resist concentration.

[10]
A method for treating a tetraalkylammonium hydroxide-containing liquid, including, upon concentrating a liquid to be treated containing tetraalkylammonium hydroxide by an evaporator,
a liquid-to-be-treated concentration step of concentrating the liquid to be treated at a concentration side by a reverse osmosis membrane device provided in a stage which is previous to the evaporator, and
a washing step of washing a reverse osmosis membrane of the reverse osmosis membrane device using a virgin tetraalkylammonium hydroxide liquid and/or permeated water produced from the reverse osmosis membrane device according to clogging of the reverse osmosis membrane.

Advantageous Effects of Invention

According to the system for treating a TAAH-containing liquid and the method for treating the same of the present invention, it is possible to reduce a concentration load applied to the evaporator by disposing the RO membrane device, as a pre-concentrating means, in a stage which is previous to the evaporator. Thereby, without additionally providing evaporators, the concentration treatment of a larger amount of the TAAH-containing liquid than ever can be realized by the existing evaporator.

Further, clogging caused by the photoresist produced at the water supply side of the RO membrane as the pre-concentrating means is washed by using at least a virgin TAAH liquid and/or permeated water obtained by treating a liquid to be treated by the reverse osmosis membrane device, and thereby recovery from a decline state of treatment capacity or a treatment-unable state caused by clogging can be efficiently resolved at low costs.

The above-described and other features and advantages of the present invention will appear more fully from the following description and the accompanying drawings.

DESCRIPTION OF EMBODIMENTS

As a system for treating a TAAH-containing liquid according to the present invention, a preferred embodiment (first embodiment) of a system for treating a development waste will be described hereinafter with reference to FIG. 1.

Figure 1:
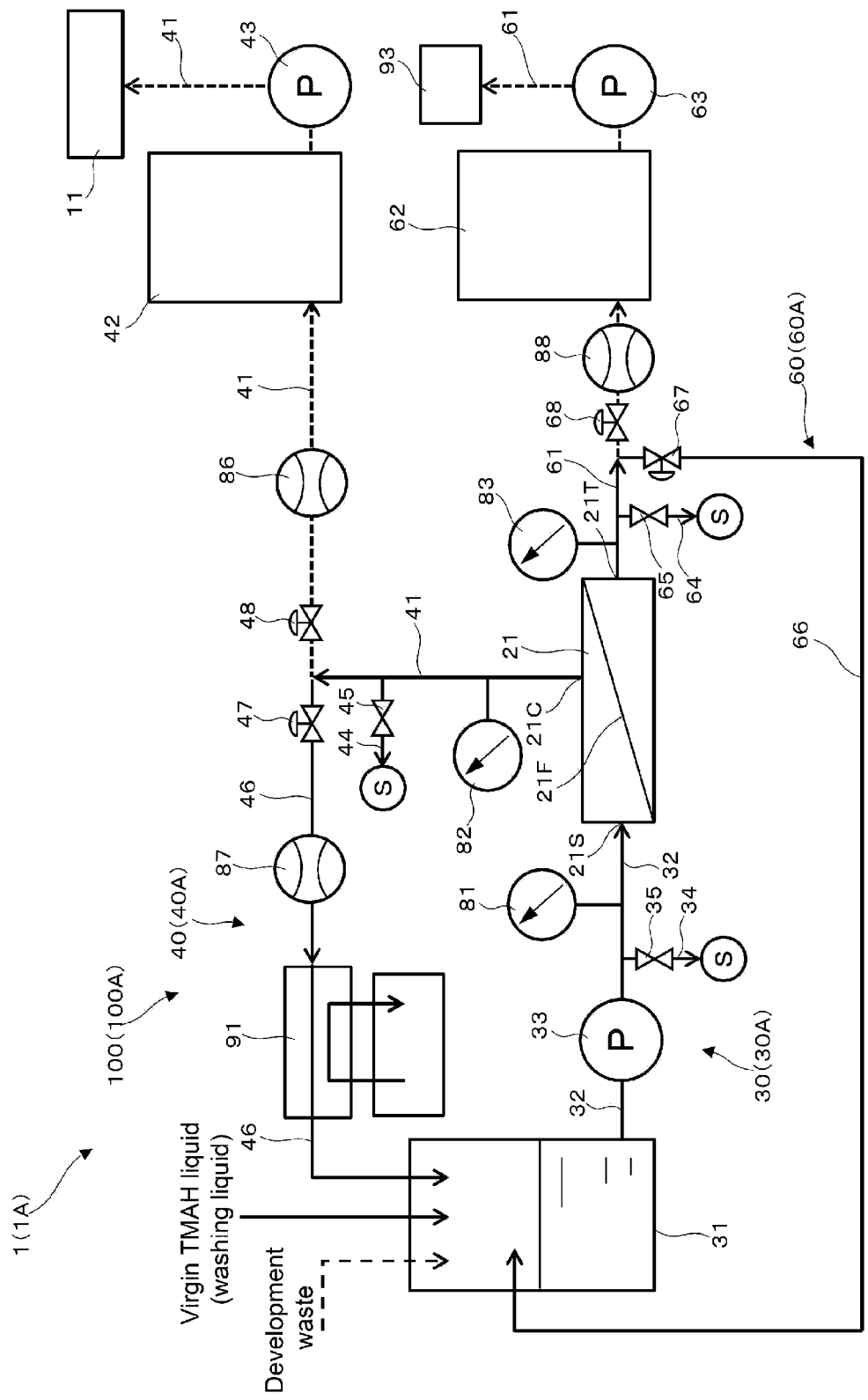
FIG. 1 is a schematic configuration diagram illustrating a preferred embodiment (first embodiment) of a system for treating a TAAH-containing liquid according to the present invention.

As illustrated in FIG. 1, a development waste treatment system 1 (1A) includes a line for supplying a liquid to be treated, which is a development waste produced in a photoresist step, to an evaporator 11 which concentrates the liquid to be treated. The liquid to be treated contains TAAH and a photoresist. In the following description with reference to FIG. 1 to FIG. 9, for example, description will be given focusing on that the liquid to be treated contains TMAH as TAAH and a photoresist. However, a case where the liquid to be treated contains TAAH other than TMAH can also be said to the same as the case of containing TMAH. Furthermore, regarding the photoresist, other than a resist using light exposure, a resist of energy ray exposure such as electron ray or X ray is also included. A high-pressure type reverse osmosis membrane (RO membrane) device 21 concentrating an untreated liquid is included in a stage which is previous to the evaporator 11. It is preferable that concentrated water produced in this RO membrane device 21 is concentrated by the evaporator 11.

Specifically, a liquid tank 31 storing (retaining) an untreated liquid used in a manufacturing process of a semiconductor apparatus, or the like is included. The RO membrane device 21 is connected to a liquid discharge side of the liquid tank 31 via a liquid supply pipe 32 supplying a liquid to be treated. One end of the liquid supply pipe 32 is connected to the liquid discharge side of the liquid tank 31 and a water supply side 21S of the RO membrane device 21 is connected to the other end of the liquid supply pipe 32. It is preferable that a liquid transfer means 33 sending a liquid in the pipe to the RO membrane device 21 side is provided in the liquid supply pipe 32. The liquid transfer means 33 is sufficient to be a means for sending a liquid, a usual pump can be used, and for example, a squeeze pump is preferably used. In this way, a liquid-to-be-treated supply system 30 is configured. This liquid-to-be-treated supply system 30 is also a washing liquid supply system 30A described below.

The evaporator 11 is connected to a concentration side 21C (concentrated water discharge side) of the RO membrane device 21 via a concentrated water pipe 41. Specifically, one end of the concentrated water pipe 41 is connected to the concentration side 21C of the RO membrane device 21, and the other end of the concentrated water pipe 41 is connected to a supply side of the evaporator 11. That is, the concentrated water pipe 41 is included as a line for supplying concentrated water concentrated by the RO membrane device 21 to the evaporator 11. It is preferable that a concentrated water tank 42 storing concentrated water once is provided in the middle of the concentrated water pipe 41. Furthermore, it is preferable that a concentrated water transfer means 43 transferring the concentrated water in the concentrated water tank 42 to the supply side of the evaporator 11 is provided in the concentrated water pipe 41 between the concentrated water tank 42 and the evaporator 11.

On the other hand, a concentrated water return pipe 46 supplying concentrated water to the liquid tank 31 is connected to the concentrated water pipe 41 between the RO membrane device 21 and the concentrated water tank 42. It is preferable that a cooler 91 is provided in the concentrated water return pipe 46. The liquid to be treated which has been warmed by the liquid transfer means 33 is cooled by this cooler 91. Thereby, an excessively increase in temperature of the liquid to be stored in the liquid tank 31 can be suppressed. The cooler 91 may use water cooling and may use other refrigerants. It is sufficient that cooling can be performed so that the temperature of the concentrated water is preferably normal temperature (20° C.±15° C. (JIS Z8703)) and more preferably about 15° C. to 25° C. It is preferable that the concentrated water return pipe 46 has a valve 47 in the vicinity of a diverging point from the concentrated water pipe 41. Furthermore, it is preferable that the concentrated water pipe 41 has a valve 48 between this diverging point and the concentrated water tank 42. In the case of treating the liquid to be treated, the valves 47 and 48 are opened while adjusting the opening degree. On the other hand, in the case of washing, the valve 47 is opened and the valve 48 is closed. In this way, a concentrated water return system 40 (40A) (circulation system at the concentration side), which returns to the liquid tank 31 through the washing liquid supply system 30A, the concentration side 21C of the RO membrane device 21, the concentrated water pipe 41, and the concentrated water return pipe 46 from the liquid tank 31, is configured.

It is preferable that one end of a permeated water pipe 61 is connected to a permeation side 21T (permeated water discharge side) of the RO membrane device 21 and the other end of the permeated water pipe 61 is connected to a dilute TAAH effluent treatment facility 93. The dilute TAAH effluent treatment facility 93 is a facility of detoxifying dilute TAAH effluent by a biotreatment, adsorption detoxification, or the like. It is preferable that a permeated water tank 62 is provided in the middle of the permeated water pipe 61, and further, it is preferable that a permeated water transfer means 63 transferring the permeated water in the permeated water tank 62 is provided in the permeated water pipe 61 between the permeated water tank 62 and the dilute TAAH effluent treatment facility 93. The permeated water transfer means 63 is sufficient to be a means for sending a liquid, a usual pump can be used, and for example, a squeeze pump is preferably used.

Furthermore, the liquid passing through the permeated water pipe 61 can also be reused in semiconductor manufacturing processes without the permeated water pipe 61 being connected to the dilute TAAH effluent treatment facility 93. Furthermore, the liquid detoxified by the dilute TAAH effluent treatment facility 93 can also be reused in semiconductor manufacturing processes.

On the other hand, a permeated water return pipe 66 supplying permeated water to the liquid tank 31 is connected to the permeated water pipe 61 between the RO membrane device 21 and the permeated water tank 62. It is preferable that the permeated water return pipe 66 has a valve 67 in the vicinity of a diverging point from the permeated water pipe 61. Furthermore, it is preferable that the permeated water pipe 61 has a valve 68 between this diverging point and the permeated water tank 62. In the case of treating the liquid to be treated, the valve 68 is opened and the valve 67 is closed. On the other hand, in the case of washing, conversely, the valve 67 is opened and the valve 68 is closed. In this way, a permeated water return system 60 (60A) (circulation system at the permeation side), which returns to the liquid tank 31 through the treatment liquid supply system 30A, the permeation side 21T of the RO membrane device 21, the permeated water pipe 61, and the permeated water return pipe 66 from the liquid tank 31, is configured. This is used as a washing system described below.

It is preferable that a RO membrane 21F of the RO membrane device 21 has a removal rate of TMAH of 99.5% by mass or more and a removal rate of the resist of 99.5% by mass or more. The TMAH removal rate is defined by [1−(TMAH concentration in permeated water/TMAH concentration in supply water)]×100%, and the resist removal rate is defined by [1−(resist concentration in permeated water/resist concentration in supply water)]×100%. Each concentration is obtained by collecting samples from collection pipes 34 and 64 in the water supply side 21S and the permeation side 21T of the RO membrane device 21 and measuring the TMAH concentration using a titrator or an electrophoresis apparatus and the resist concentration using an absorbance indication value of an absorptiometer.

Furthermore, the RO membrane device 21 has a mechanism of discharging water (concentrated water) obtained by concentrating salts or impurities, and by discharging the concentrated water, permeated water can be continuously obtained while suppressing an excessive increase in salt concentration on the pressurization side or generation of a material having a low solubility (scale) in the membrane surface.

Further, the RO membrane 21F preferably has resistance to a strong alkaline solution such as the case where a liquid to be treated is a development waste (for example, pH 12 or more). As such a high-pressure type RO membrane, an RO membrane of a polyamide membrane is exemplified. Specifically, SWC5 (trade name) manufactured by Nitto Denko Corporation is exemplified. This RO membrane is confirmed that there is no problem in usage of the membrane since the manufacturer-recommended pH range is normally pH 2 to 11 and the pH at the time of washing is pH 1 to 13, but there is no change in material even if a continuous test (continuous operation for 3620 hours (about 150 days)) supplying a liquid to be treated having a pH of about 12 is performed.

The development waste treatment system 1 has the RO membrane device 21 in a stage which is previous to the evaporator 11, and thus the liquid to be treated can be concentrated by the RO membrane device 21. For example, in the case of treating a liquid to be treated, when the TMAH concentration of the liquid to be treated is 1% by mass, the liquid is concentrated three-fold by the RO membrane device 21 to have a concentration of 3% by mass, and is further concentrated by the evaporator 11 to have a concentration of 25% by mass. That is, it is sufficient that the concentrated water amount of the evaporator is ⅓ of the conventional amount.

In this way, since the amount of the water to be concentrated by the evaporator 11 is reduced, the treatment amount of the liquid to be treated which can be concentrated by one evaporator 11 can be increased. As a result, the treatment amount of the liquid to be treated can be increased without additionally providing the evaporator 11 that involves apparatus cost, and thus the concentration treatment of the liquid to be treated can be efficiently performed at low costs.

Regarding the RO membrane 21F of the RO membrane device 21, in a case where the liquid to be treated containing photoresist is subjected to the concentration treatment over a long period of time, the photoresist adheres to the water supply side 21S of the RO membrane 21F and the permeated water amount is decreased in some cases. In such a case, the washing system 100 (100A) washing the water supply side 21S of the RO membrane 21F of the RO membrane device 21 by using at least a virgin TMAH liquid (an unused liquid containing TMAH) and/or permeated water obtained by treating the liquid to be treated by the RO membrane device 21 becomes effective. That is, the resist adhering to the concentration side 21C of the RO membrane 21F can be removed by the washing system 100. As a result, the permeate flux which has been lowered in the treatment of the liquid to be treated can be recovered, and a decrease in permeated water amount can be recovered.

It is preferable that the washing liquid contains TMAH and then is used. Usually, since what adheres to the water supply side of the RO membrane 21F is the resist mainly dissolved by development, by containing TMAH in the washing liquid, the resist is in a dissolved state and is easily removed.

Next, the washing system will be described.

In the case of the development waste treatment system 1A, the washing system 100A is configured by the aforementioned washing liquid supply system 30A in common with the liquid-to-be-treated supply system 30, a concentrated water return system 40A, and the permeated water return system 60A.

The above-described washing liquid supply system 30A has the same configuration as that of the aforementioned liquid-to-be-treated supply system 30. The concentrated water return system 40A is connected to the RO membrane device 21 to communicate with the liquid tank 31 and is configured by the concentrated water pipe 41 and the concentrated water return pipe 46. Incidentally, the concentrated water pipe 41 corresponds to a part from the concentration side 21C of the RO membrane device 21 to a portion to which the concentrated water return pipe 46 is connected. It is preferable that the cooler 91 is provided in the concentrated water return pipe 46. Furthermore, the permeated water return system 60A is configured by a part of the permeated water pipe 61 which is connected to the permeation side of the RO membrane device and the permeated water return pipe 66 which is diverged from the permeated water pipe 61 and communicates with the liquid tank 31. Incidentally, the permeated water pipe 61 corresponds to a part from the permeation side 21T of the RO membrane device 21 to a portion to which the permeated water return pipe 66 is connected.

In this way, the washing system 100A is a total circulation system of the virgin TMAH liquid having been supplied to the liquid tank 31 with the liquid tank 31 being centered, the circulation system including the concentrated water return system 40A and the permeated water return system 60A.

Next, a measuring instrument of the development waste treatment system 1 (1A) will be described.

It is preferable that, in the liquid supply pipe 32, the liquid collection pipe 34 collecting a liquid flowing in the pipe is connected between the transfer means 33 and the RO membrane device 21 via a valve 35. Furthermore, it is preferable that, in the liquid supply pipe 32, a pressure gauge 81 is provided between the liquid collection pipe 34 and the RO membrane device 21.

It is preferable that, in the concentrated water pipe 41, the concentrated water collection pipe 44 collecting a liquid flowing in the pipe is connected between the RO membrane device 21 and the concentrated water tank 42 and a valve 45 is provided in the concentrated water collection pipe 44. Furthermore, it is preferable that, in the concentrated water pipe 41, a pressure gauge 82 is provided between a diverging point of the concentrated water collection pipe 44 and the RO membrane device 21. Further, it is preferable that, in the concentrated water pipe 41, a flow meter 86 is provided between diverging point of the concentrated water pipe 41 of the concentrated water return pipe 46 and the concentrated water tank 42.

It is preferable that, in the concentrated water return pipe 46, a flow meter 87 is provided between diverging point of the concentrated water pipe 41 of the concentrated water return pipe 46 and the cooler 91.

It is preferable that, in the permeated water pipe 61, a permeated water collection pipe 64 collecting a liquid flowing in the pipe is connected between the RO membrane device 21 and the permeated water tank 62 and a valve 65 is provided in the permeated water collection pipe 64. Furthermore, it is preferable that, in the permeated water pipe 61, a flow meter 88 is provided between the permeated water collection pipe 64 and the permeated water tank 62.

A pH meter, a TMAH concentration meter, a resist absorbance measuring apparatus, and the like may be connected to the liquid collection pipe 34, the concentrated water collection pipe 44, and the permeated water collection pipe 64 (hereinafter, also referred to as the collection pipes).

Regarding the liquids flowing in the liquid supply pipe 32, the concentrated water pipe 41, and the permeated water pipe 61, samples can be acquired from the respective collection pipes 34, 44, and 64 by opening the valves 35, 45, and 65 provided in the respective collection pipes 34, 44, and 64. Usually, the respective valves 35, 45, and 65 are closed, and these valves are opened at the time of sample collection.

General pressure gauges, digital pressure gauges, diaphragm pressure gauges, and the like can be used in the respective pressure gauges 81, 82, and 83, and from the viewpoints of high alkali resistance and high pressure, diaphragm pressure gauges are preferred. For example, Model No. SC (trade name) manufactured by NAGANO KEIKI CO., LTD. is mentioned.

An area type flow meter, an impeller type flow meter, electromagnetic flow meter, and the like can be used as each of the flow meters 86, 87, and 88, and an area type flow meter is preferred from the viewpoints that the structure is simple and pH resistance can be secured depending on a material to be used. As such a flow meter, Purgemeter (trade name) manufactured by TOKYO KEISO CO., LTD. is exemplified.

Hereinafter, main component parts will be described.

The evaporator 11 is a device having a function of positively evaporating a solid or a fluid by reducing pressures. Specifically, the evaporator 11 is a device facilitating the moisture of effluent to be evaporated by reducing pressures inside the evaporator warmed by a heat source such as steam by a vacuum pump or the like, and is a device which is generally used in volume reduction of effluent, or the like. For example, VVCC concentration apparatus (trade name) manufactured by Sasakura Engineering Co., Ltd. is mentioned.

The above-described RO membrane device 21 is not particularly limited, and may be any of high-pressure type, intermediate-pressure type, low-pressure type, and ultralow-pressure type RO membrane devices. However, it is preferable to use the high-pressure type RO membrane having a TMAH removal rate of 99.5% by mass or more and a photoresist removal rate of 99.5% by mass or more as described above.

The liquid tank 31 is a tank in which a photoresist-containing development waste or a washing liquid is stored as the liquid to be treated. The photoresist-containing development waste is a mixed liquid of TMAH of the developer, the dissolved photoresist, and water. Furthermore, a liquid derived from the photoresist-containing development waste is also contained. Specific examples of the liquid derived from the photoresist-containing development waste include concentrated water produced from the RO membrane device 21 and permeated water produced from the RO membrane device 21.

Since the liquid transfer means 33 sending a solution from the liquid tank 31 to the RO membrane device 21 sends a development waste of a strong alkaline solution, at least a flow path is preferably configured by an alkali-resistant material. For example, a high-pressure pump with a flow path made of a metal, an alkali-resistant material, or the like is exemplified. For example, Process Pump (trade name) manufactured by Nikuni Co., Ltd. is mentioned.

The concentrated water tank 42 is a tank temporarily storing concentrated water produced by the RO membrane device 21, and may contain a liquid obtained after washing in the case of washing the RO membrane 21F using a liquid containing a developer. Therefore, it is preferable to have alkaline resistance. Furthermore, a liquid obtained after washing the RO membrane 21F using the permeated water of the RO membrane device or the concentrated water of the RO membrane device may be contained.

The permeated water tank 62 is a tank temporarily storing permeated water produced by the RO membrane device 21. The permeated water in the tank has an extremely low concentration of the TMEH component, and the permeated water in the tank can be sent to the dilute TAAH effluent treatment facility 93 without any changes by operating the permeated water transfer means 63.

Regarding the liquid transfer means 33, for example, a squeeze pump is preferably used. Since the squeeze pump sends a liquid to be treated containing a development waste of a strong alkaline solution, at least a flow path or an in-pump component is preferably configured by an alkali-resistant material. For example, Process Pump manufactured by Nikuni Co., Ltd. is mentioned.

Regarding the concentrated water transfer means 43, for example, the same squeeze pump as that of the liquid transfer means 33 is preferably used.

Regarding the permeated water transfer means 63, for example, a squeeze pump is preferably used. Since the squeeze pump sends permeated water of an alkaline solution, at least a flow path or an in-pump component is preferably configured by an alkali-resistant material. For example, Magnetic Drive Pump (trade name) manufactured by IWAKI CO., LTD. is mentioned.

Next, a preferred example of a method for treating a development waste by the system for treating the development waste illustrated in FIG. 1 will be described.

In the case of treating the development waste, the development waste is supplied to the liquid tank 31 and the development waste in the liquid tank 31 is fed into the RO membrane device 21 by the liquid transfer means 33. It is preferable that the permeated water permeated through the RO membrane 21F of the RO membrane device 21 is transferred to the permeated water tank 62 through the permeated water pipe 61, and the permeated water of the permeated water tank 62 is further sent to the dilute TAAH effluent treatment facility 93 by the permeated water transfer means 63.

On the other hand, some of the concentrated water produced by the RO membrane device 21 is supplied to the concentrated water tank 42 through the concentrated water pipe 41, is sent to the evaporator 11 by the concentrated water transfer means 43, and is further concentrated. The remaining concentrated water is returned to the liquid tank 31 from the concentrated water pipe 41 through the concentrated water return pipe 46. The ratio of the concentrated water returned to the liquid tank 31 and the concentrated water supplied to the concentrated water tank 42 can be appropriately adjusted according to the purpose by adjusting the opening degree of the valves 47 and 48. Although not illustrated in the drawing, for example, it is preferable that the flow rate is adjusted to a desired flow rate value by adjusting the opening degree of the valves 47 and 48 while the flow rate values of the flow meters 86 and 87 are fed back.

By doing this, it is preferable that, by returning some of the concentrated water to the liquid tank 31, the water amount to be supplied to the RO membrane 21F is set to be larger than the minimum concentrated water amount of the RO membrane 21F. In this case, since the development waste is warmed by the liquid transfer means 33 but is cooled by the cooler 91, the concentrated water to be returned to the liquid tank 31 is preferably set to, for example, normal temperature. Usually, in the development step of the resist film, since warming of the developer or warming of pure water of the washing liquid is not performed, the development waste is at normal temperature. Therefore, since the concentrated water to be returned to the liquid tank 31 is cooled, an excessive increase in temperature of the liquid in the liquid tank 31 is avoided even if the concentrated water is returned to the liquid tank 31.

For example, a specific example of the method for treating the development waste will be described by a mass balance illustrated in FIG. 2. Numerical values of flow rate, mass %, pH, and the like described below are merely examples and are not limited to these numerical values.

The development waste has, for example, a TMAH concentration of 0.476% by mass, a pH of 12 or more, and a resist concentration (absorbance at a wavelength of 290 nm, optical path length: 10 mm) of 0.660 and is supplied at a flow rate of 200 L/h to the liquid tank 31 as supply water (RO raw water). Hereinafter, the resist concentration refers to an absorbance at a wavelength of 290 nm. Furthermore, 520 L/h of some of the concentrated water (circulated water) of the development waste obtained by the RO membrane device 21 is mixed with the above-described development waste so that the water amount of the supply water to the RO membrane device 21 is 720 L/h. Thereby, the concentrated water of the RO membrane device 21 is set to 600 L/h that is equal to or more than the minimum concentrated water amount (for example, 600 L/h) and the permeated water is set to 120 L/h.

For example, the TMAH concentration of the supply water supplied to the RO membrane device 21 is 0.989% by mass, the pH is 12 or more, and the resist concentration is 1.347. Then, the TMAH concentration of the concentrated water of the RO membrane device 21 is 1.185% by mass, the pH is 12 or more, and the resist concentration is 1.518. The TMAH concentration of the permeated water of the RO membrane device 21 is 0.003% by mass, the pH is 10.4 or more, and the resist concentration is 0.000.

The entire amount of the above-described concentrated water is not returned to the liquid tank 31, and for example, 520 L/h thereof is returned and the remaining 80 L/h is sent as blow water of the concentrated water to the concentrated water tank 42.

The pH, the TMAH concentration, and the resist concentration in the above-described example are collectively presented as shown in Table 1.

TABLE 1

| Sample name | pH | TMAH concentration (mass %) | Resist concentration (absorbance at 290 nm) |
| --- | --- | --- | --- |
| Development waste | >12 | 0.476 | 0.660 |
| RO supply water | >12 | 0.988 | 1.347 |

TABLE 1-continued

| Sample name | pH | TMAH concentration (mass %) | Resist concentration (absorbance at 290 nm) |
|---|---|---|---|
| RO concentrated water | >12 | 1.185 | 1.518 |
| RO permeated water | 10.4 | 0.003 | 0.000 |

By doing this, by supplying 200 L/h of the development waste and discharging 120 L/h as the permeated water and 80 L/h as the concentrated water at all times, the remaining concentrated water 520 L/h is returned to the liquid tank 31.

Since the concentrated water to be sent to the concentrated water tank 42 (concentrated blow water: discharge side) is set to 80 L/h with respect to 200 L/h of the "development waste", the operation condition of 200/80=2.5-fold concentration is established (the resist concentration is also almost 2.5-fold concentration).

In the above-described case, 2.5-fold concentration is set as a target, the mass balance as described above is achieved. It is preferable to achieve the mass balance by returning some of the concentrated water by the concentrated water return system 40 in this way to maintain the flow rate of the supply water, which is supplied to the RO membrane device 21, at 720 L/h that is equal to or more than the minimum concentrated water amount.

That is, it is preferable to secure the water amount necessary for stably operating the RO membrane device 21 and to balance each liquid amount so as to be a target concentration rate. Incidentally, each flow rate described above is merely an example and is not limited to the above-described flow rate value.

Figure 3:
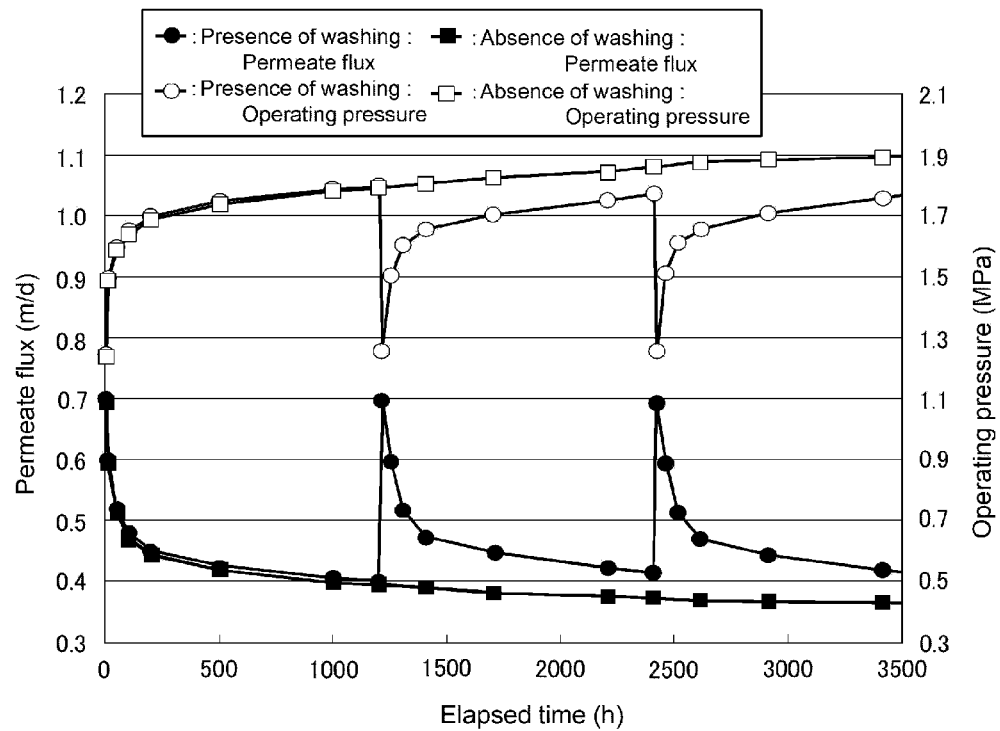
FIG. 3 is a relationship diagram of a permeate flux and an operating pressure with an elapsed time of a TAAH-containing liquid (development waste) treatment depending on the presence or absence of a washing step.

As shown in FIG. 3, for example, when the treatment time of the development waste is lapsed and the RO membrane is clogged with resist, the permeate flux is decreased, and the operating pressure is increased. In this regard, it is preferable that washing of the RO membrane 21F is performed, for example, when the permeate flux and/or the operating pressure becomes a threshold. Furthermore, it is preferable that washing of the RO membrane 21F is performed, for example, when the treatment time of the development waste elapses by a predetermined time (for example, 1200 hours). Then, by performing washing, the permeate flux and the operating pressure can be returned to the initial state. Therefore, it is preferable to periodically perform the washing of the RO membrane 21F. Although depending on the specification of the RO membrane 21F, it is preferable to perform washing of the RO membrane 21F, for example, when the permeate flux reaches about 60% of the initial state (for example, 0.4 m/d or less). Alternatively, it is preferable to perform washing of the RO membrane 21F when the operating pressure reaches about 1.5 times of the initial state (for example, 1.8 MPa or more).

Next, a preferred example of a washing method of the RO membrane 21F of the RO membrane device 21 will be described.

In the case of washing the RO membrane 21F of the RO membrane device 21, all of the development waste in the system of the RO membrane device 21 is discharged once. At this time, the concentrated water obtained by treating the development waste in the concentrated water tank 42 and the permeated water obtained by treating the development waste in the permeated water tank 62 are also discharged, and also including each pipe, the inside of each of the liquid tank 31, the RO membrane device 21, the concentrated water tank 42, and the permeated water tank 62 are emptied. Then, the virgin TMAH liquid is supplied to the liquid tank 31. Next, the valve 68 is closed, the valve 67 is opened, and then the permeated water return system 60 is opened. Furthermore, the valve 48 is closed, the valve 47 is opened, and then the concentrated water return system 40 is opened. In this way, the concentrated water return system 40, which returns to the liquid tank 31 through the washing liquid supply system 30A, the concentration side 21C of the RO membrane device 21, the concentrated water pipe 41, and the concentrated water return pipe 46 from the liquid tank 31, is opened. In addition, it is preferable that the permeated water return system 60, which returns to the liquid tank 31 through the washing liquid supply system 30A, the permeation side 21T of the RO membrane device 21, the permeated water pipe 61, and the permeated water return pipe 66 from the liquid tank 31, is opened to circulate the entire amount of the washing liquid.

Specifically, first, the virgin TMAH liquid is supplied as the washing liquid to the liquid tank 31 from which the development waste is removed. This supply amount is preferably equal to or more than the minimum concentrated water amount of the RO membrane 21F. As the virgin TMAH liquid, a usual TMAH developer having a TMAH concentration of, for example, 2.38% by mass, which is not used in the resist film development, can be used, and a TMAH developer having a higher concentration than this usual TMAH developer can also be used. The TMAH concentration in the washing liquid can be appropriately changed. This virgin TMAH liquid is sent to the RO membrane device 21 by the liquid transfer means 33 to wash the water supply side of the RO membrane 21F. In this case, in order to use the virgin TMAH liquid without a loss and to secure the minimum concentrated water amount of the RO membrane 21F, it is preferable to return the washing liquid permeated through the RO membrane device 21 to the liquid tank 31. In addition, it is preferable that the entire amount of the concentrated water discharged from the concentration side 21C is also returned to the liquid tank 31. It is preferable that, by doing this, the amount of the liquid supplied to the RO membrane device 21 is secured to be equal to or more than the minimum concentrated water amount of the RO membrane 21F.

The above-described washing time is preferably 4 hours, for example. For example, 50 L of the virgin TMAH liquid is supplied to the liquid tank 31 and is circulated using the concentrated water return system 40 and the permeated water return system 60 to be returned to the liquid tank 31. At this time, the washing liquid is circulated so as to secure the minimum concentrated water amount. Then, the washing liquid is similarity circulated again. It is preferable to repeatedly perform this operation for 4 hours. As a result of washing for 4 hours by the washing method described above with FIG. 1, changes in TMAH concentration of the washing liquid and resist concentration of the washing liquid as the supply water to the RO membrane device 21 with respect to the washing time are shown in Table 2 and FIG. 4.

Figure 4:
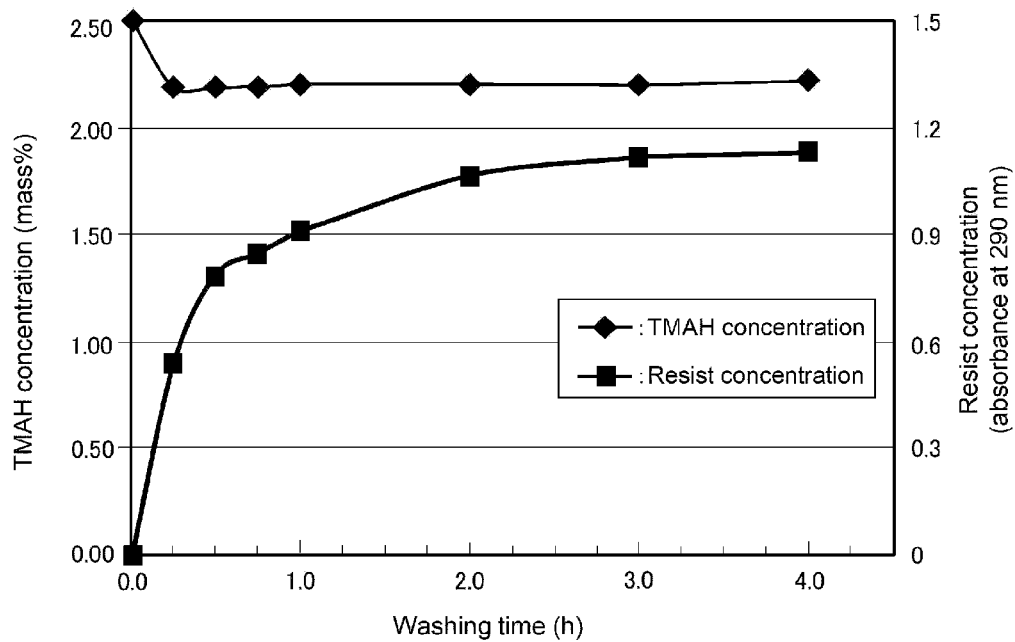
FIG. 4 is a relationship diagram of a TMAH concentration and a washing time in a washing step.
Figure 5:
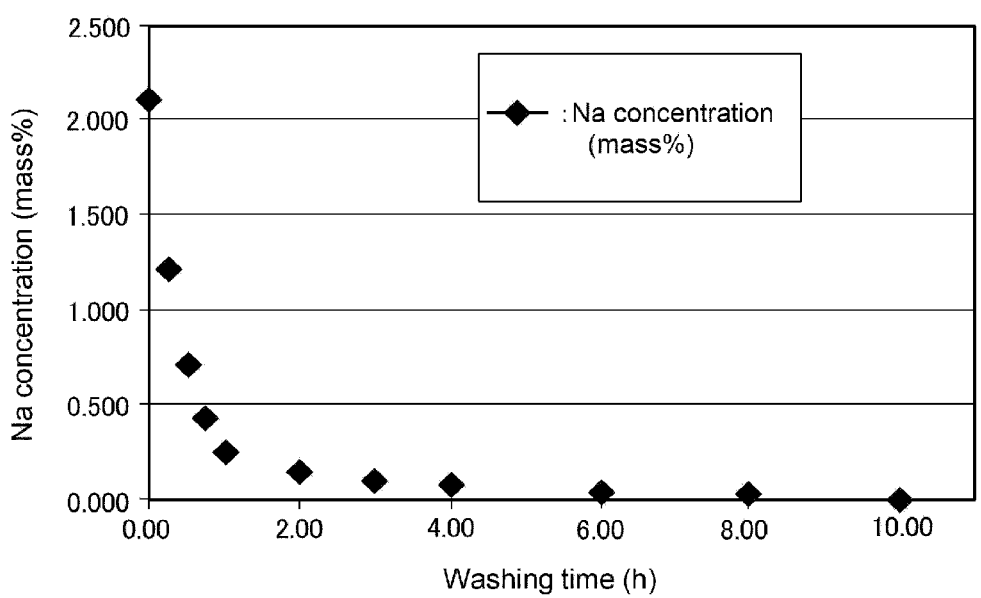
FIG. 5 is a relationship diagram of a Na concentration and a washing time in a pure water washing step.

As shown in Table 2 and FIG. 4, a virgin TMAH liquid having a TMAH concentration of, for example, 2.50% by mass is used as the washing liquid. For example, after 0.25 hours from the start of the washing, the development waste having a weak TMAH concentration which remains in the system is mixed so that the TMAH concentration is lowered in some cases. Usually, since the TMAH concentration of the developer is 2.38% by mass, the TMAH concentration of the washing liquid is decreased in some cases. Thereafter, the TMAH concentration becomes almost constant and then stabilized.

Regarding the flow rate of the washing liquid, it is preferable that the flow rate immediately before the RO membrane device 21 (as measured by a flow meter (not illustrated)) is equal to or more than the minimum concentrated water amount of the RO membrane 21F. For example, the entire amount of the above-described concentrated water is returned to the liquid tank 31 as blow water without being sent to the concentrated water tank 42. For example, 600 L/h of the concentrated water is returned as concentrated water-circulated water. Moreover, it is preferable that the entire amount of the permeated water is also returned (circulated) to the liquid tank 31. In this way, since the minimum concentrated water amount of the RO membrane 21F is secured even if the entire amount of both of the concentrated water and the permeated water is circulated, there is no concern of an increase in concentration in the RO membrane 21F.

Furthermore, the resist concentration in the washing liquid measured by collecting the washing liquid from the Since the washing is washing using a virgin TMAH liquid, it is not necessary to perform pure water washing after the developer used in washing is removed after washing, and the treatment of the development waste can be performed immediately after the washing step. For example, as shown in Table 3, 0.25 hours, 0.25 hours, 4 hours, and 0.25 hours are necessary for development waste extraction, washing liquid injection, washing, and washing liquid extraction, respectively, and the washing time of 4.75 hours in total is only necessary. On the other hand, a strong alkaline sodium hydroxide solution can also be used as the washing liquid, but, in this case, for example, as shown in Table 3, it is necessary that sodium does not remain in the system by performing pure water washing for about 10 hours after washing. For example, 0.25 hours, 0.25 hours, 4 hours, 0.25 hours, 0.25 hours, 10 hours, and 0.25 hours are necessary for development waste extraction, washing liquid injection, washing, washing liquid extraction, pure water injection, pure water washing of the system inside, and pure water washing liquid extraction, respectively, and the washing time of 15.25 hours in total is necessary.

TABLE 3

| | | | Case of TMAH washing | | | | |
|---|---|---|---|---|---|---|---|
| Washing step | Operation stop | Development waste extraction | Washing liquid injection | Washing | Washing lquid extraction | Operation esumption | Total |
| Time (h) | — | 0.25 | 0.25 | 4.00 | 0.25 | — | 4.75 |
| | | | Case of NaOH washing | | | | | | |
| Washing step | Operation stop | Development waste extraction | Washing liquid injection | Washing | Washing liquid extraction | Pure water injection | Washing of system inside | Pure water washing liquid extraction | Operation resumption | Total |
| Time (h) | — | 0.25 | 0.25 | 4.00 | 0.25 | 0.25 | 10.00 | 0.25 | — | 15.25 | liquid collection pipe 34 immediately before the RO membrane device 21 is 0 at the time of the start of the washing and increases as the washing proceeds, but as shown in Table 2 and FIG. 4, an increase in concentration is almost stopped after 3 to 4 hours from the start of the washing. An increase in resist concentration being almost stopped in this way means that the resist removal does not almost proceed by washing. In other words, an increase in resist concentration being almost stopped means that there is no resist to be removed by washing. That is, this indicates that washing can be performed. Therefore, the washing time is preferably set to, for example, 4 hours. The washing time varies depending on the TMAH concentration of the washing liquid, the washing liquid flow rate, and the like, but it can be said that a sufficient washing effect is obtained when the washing is performed for 4 hours.

In the above-described pure water washing, the sodium concentration is required to be, for example, 0.005% by mass or less so that the sodium concentration approaches to 0% by mass as much as possible. Therefore, as shown in Table 4 and FIG. 5, the pure water washing for at least about 10 hours is required. If even a minute amount of sodium ions exist, for example, in a gate oxide film in a MOS transistor, the sodium ions cause leak current to deteriorate switching characteristics of the transistor. Depending on circumstances, a current constantly flows between a source and a drain, and thus the transistor does not function as the transistor. As described above, since the sodium ions cause degradation of performance of a semiconductor apparatus, generally, it is essential to remove the sodium ions from the inside of the washing system without returning to the semiconductor manufacturing processes.

TABLE 2

| | | Washing time (h) | | | | | | | |
|---|---|---|---|---|---|---|---|---|---|
| Sample name | | 0.00 | 0.25 | 0.50 | 0.75 | 1.00 | 2.00 | 3.00 | 4.00 |
| Washing liquid | TMAH concentration (mass %) | 2.50 | 2.20 | 2.20 | 2.20 | 2.21 | 2.21 | 2.21 | 2.22 |
| RO supply water | Resist concentration (absorbance at 290 nm) | 0 | 0.536 | 0.786 | 0.845 | 0.908 | 1.064 | 1.120 | 1.132 |

TABLE 4

| Sample name | | Washing time (h) | | | | | | | | | | |
|---|---|---|---|---|---|---|---|---|---|---|---|---|
| | | 0.00 | 0.25 | 0.50 | 0.75 | 1.00 | 2.00 | 3.00 | 4.00 | 6.00 | 8.00 | 10.00 |
| Washing liquid | Sodium ion concentration (mass %) | 2.100 | 1.215 | 0.708 | 0.422 | 0.255 | 0.150 | 0.101 | 0.080 | 0.042 | 0.027 | 0.004 |

In the case of performing washing using the washing system 100A illustrated in FIG. 1, since a virgin TMAH liquid (resist concentration: 0.000) is used as the washing liquid, the resist concentration of the washing liquid is not increased unlike the development waste. As for the washing liquid, since an additional liquid is necessary when the washing liquid-permeated water is discharged, the RO membrane permeated water and the concentrated water of the washing liquid are returned to the liquid tank and then are reused. Thereby, the washing flow rate of the RO membrane 21F is secured. Furthermore, since the washing liquid-concentrated water is concentrated water obtained after passing the virgin TMAH liquid through the reverse osmosis membrane device, the resist concentration of this concentrated water is lower than that of the concentrated water discharged at the time of development waste treatment. Therefore, the resist concentration of the washing liquid obtained by combining the new TMAH liquid, the washing liquid-permeated water, and the washing liquid-concentrated water is about 1.1 that is lower than that of the RO concentrated water at the time of operation, even when the washing liquid-concentrated water is added, and the washing liquid sufficiently has a capability of removing the resist from the surface on the concentration side of the reverse osmosis membrane 21F. Hereinafter, the concentrated water discharged from the concentration side 21C after causing the washing liquid to pass through the RO membrane device 21 is referred to as washing liquid-concentrated water.

Incidentally, in a case where the concentrated water of the virgin TMAH liquid produced by the RO membrane device 21 is not returned to the liquid tank 31, in order to secure the washing liquid amount, the supply amount of the virgin TMAH liquid needs to be increased. Furthermore, at the time of washing, when the washing liquid-concentrated water produced from the concentration side 21C of the RO membrane device 21 is supplied to the concentrated water tank 42, the concentration of the concentrated water obtained by treating the development waste stored in the concentrated water tank 42 is attenuated. Therefore, it is preferable that the entire amount of the washing liquid-concentrated water is returned to the liquid tank 31. By doing this, it is preferable that the supply water amount of the washing liquid to the RO membrane device 21 is secured so that the concentrated water amount equal to or more than the minimum concentrated water amount of the RO membrane 21F can be discharged.

In this way, according to the present invention, there is provided a system for treating a development waste containing TAAH produced in a photolithographic process, in which a part of the system configured by including a reverse osmosis membrane device is also utilized as a washing system for washing a reverse osmosis membrane of the reverse osmosis membrane device. The treatment system in the first embodiment has:

(a-1) a liquid tank retaining a development waste produced in a photolithographic process, (b-1) a liquid supply pipe having one end connected to a liquid discharge side of the liquid tank, (c-1) a reverse osmosis membrane device to which the other end of the liquid supply pipe is connected and supplying concentrated water of the reverse osmosis membrane device to an evaporator, (d-1) a concentrated water pipe having one end connected to a concentration side of the reverse osmosis membrane device, (e-1) a concentrated water return pipe connected to the concentrated water pipe and supplying the concentrated water of the reverse osmosis membrane device to the liquid tank, (f-1) a permeated water pipe having one end connected to a permeation side of the reverse osmosis membrane device, (g-1) a dilute TAAH effluent treatment facility connected to the other end of the permeated water pipe, and (h-1) a permeated water return pipe connected to the permeated water pipe and supplying permeated water of the reverse osmosis membrane device to the liquid tank, and in which the washing system is a system washing a reverse osmosis membrane of the reverse osmosis membrane device by supplying a virgin TAAH liquid to the liquid tank and circulating the virgin TAAH liquid in both circulation systems of a circulation system formed by the (a-1) to (d-1) and (e-1) and a circulation system formed by the (a-1) to (c-1), (f-1), and (h-1).

Next, as a system for treating a TAAH-containing liquid including a washing system 100 (100B), a preferred embodiment (second embodiment) of a development waste treatment system 1 (1B) will be described with reference to the drawing.

Figure 6:
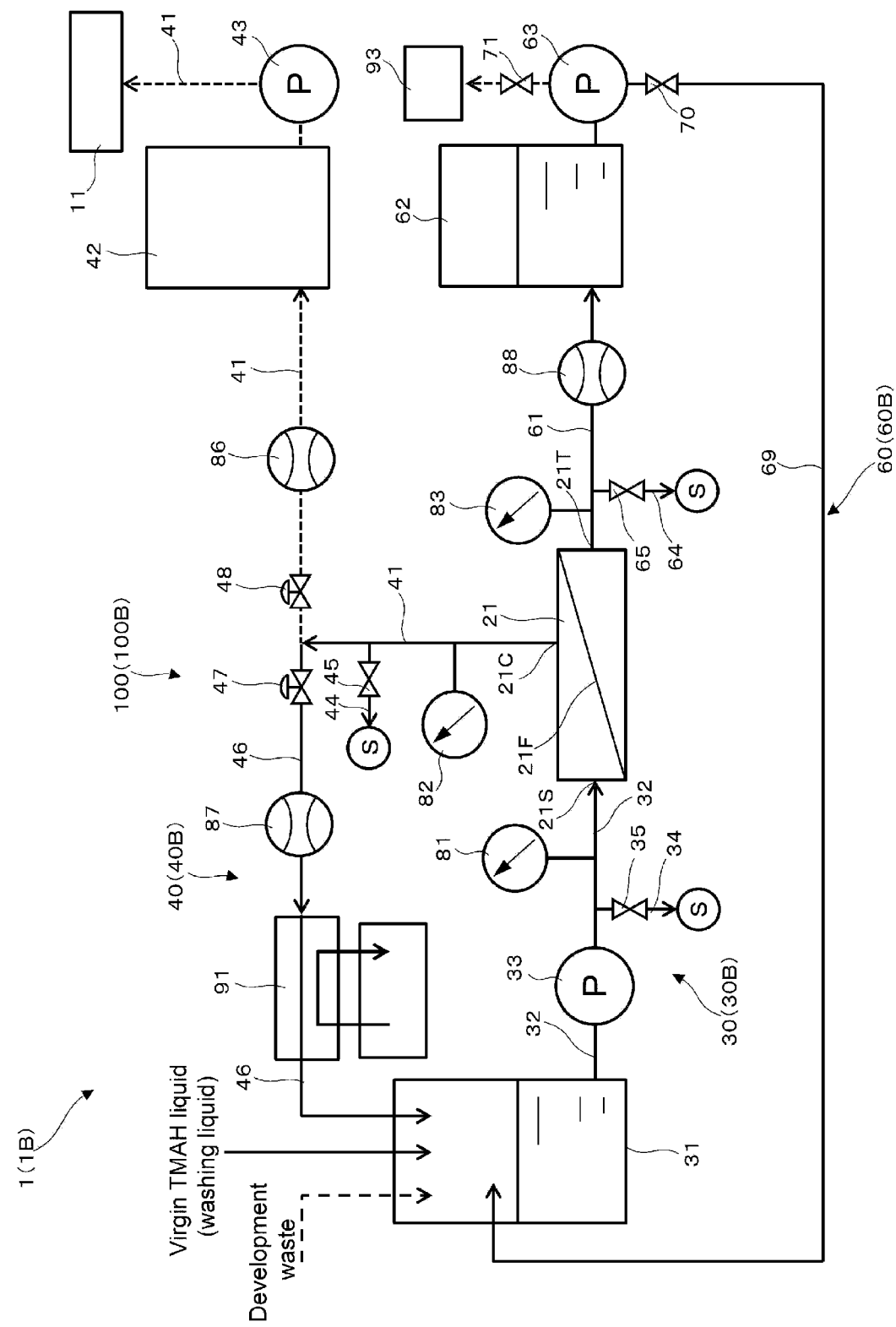
FIG. 6 is a schematic configuration diagram illustrating a preferred embodiment (second embodiment) of a system for treating a TAAH-containing liquid according to the present invention.

As illustrated in FIG. 6, the development waste treatment system 1B has the same configuration as that of the development waste treatment system 1 (1A), except that, in the aforementioned development waste treatment system 1A, the diverging position of the permeated water return pipe 66 and disposition of the valves 67 and 68 are changed.

That is, the permeated water return system 60 is diverged from the permeated water transfer means 63 provided in the permeated water pipe 61 on the downstream side of the permeated water tank 62 and supplies the permeated water to the liquid tank 31. The permeated water pipe 61 is connected to the dilute TAAH effluent treatment facility 93 in the other side of the permeated water transfer means 63.

It is preferable that a permeated water return pipe 69 has a valve 70 on the downstream side of the permeated water transfer means 63. Furthermore, it is preferable that a valve 71 is provided in the permeated water pipe 61 on the downstream side of the permeated water transfer means 63. In the case of treating the development waste, the valve 71 is opened and the valve 70 is closed. On the other hand, in the case of washing, conversely, the valve 70 is opened and the valve 71 is closed. In this way, a permeated water return system 60 (60B) (circulation system at the permeation side), which returns to the liquid tank 31 through a washing liquid supply system 30B, the permeation side 21T of the RO membrane device 21, the permeated water pipe 61, the permeated water tank 62, and the permeated water return pipe 69 from the liquid tank 31, is configured. Incidentally, the concentrated water circulation system is the same as that in the aforementioned first embodiment. Furthermore, the treatment for the development waste is the same as that in the development waste treatment system 1A.

In the above-described washing system 100B, a virgin TMAH liquid is used as the washing liquid. Further, the permeated water, which has been accumulated in the permeated water tank 62 and permeated through the RO membrane device 21, is also used at the time of washing. Therefore, the resist concentration of the washing liquid is, for example, 0.002, and the resist concentration is sufficiently low. By accumulating the washing liquid-permeated water in the permeated water tank 62 in this way, in a case where the washing liquid is insufficient, a larger amount of the washing liquid than the permeated water amount is supplied to the liquid tank 31 so that the minimum concentrated water amount of the RO membrane device 21 can be secured. Further, since the flow rate of the washing liquid cannot be sufficiently secured only by the virgin TMAH liquid and the washing liquid-permeated water, the concentrated water obtained by treating the washing liquid with the RO membrane is also returned to the liquid tank 31 and then is reused. Thereby, the entire amount of the virgin TMAH liquid supplied to the liquid tank 31 can be efficiently used, and the minimum concentrated water amount (washing flow rate) of the RO membrane 21F is secured.

Furthermore, since the concentrated water is washing liquid-concentrated water obtained after passing the washing liquid through the RO membrane device 21, the resist concentration of this concentrated water is significantly lower than that of the concentrated water discharged at the time of development waste treatment. Moreover, since the washing liquid-concentrated water is combined with the virgin TMAH liquid and the washing liquid-permeated water and then is used as the washing liquid, although the resist is contained, the resist concentration thereof is significantly lower than that of the development waste. Therefore, the RO membrane device has a sufficient capability for removing the resist from the surface (the water supply side 21S) of the RO membrane 21F. Hereinafter, the permeated water discharged from the permeation side 21T after causing the washing liquid to pass through the RO membrane device 21 is referred to as washing liquid-permeated water.

As described above, when a concentrated water return system 40B is not specified in the washing system 100B, in order to secure the washing liquid amount, the supply amount of the permeated water from the permeated water tank 62 needs to be increased or the supply amount of the virgin TMAH liquid needs to be increased.

Furthermore, when the washing liquid-concentrated water produced from the concentration side 21C is supplied to the concentrated water tank 42, the concentration of the concentrated water stored in the concentrated water tank 42 is weak. Therefore, it is preferable that the entire amount of the concentrated water in the case of washing is returned to the liquid tank 31. By doing this, it is preferable that the supply water amount of the washing liquid to the RO membrane device 21 is secured so that the concentrated water amount equal to or more than the minimum concentrated water amount of the RO membrane 21F can be discharged.

Since the washing is washing using a virgin TMAH liquid and the permeated water obtained by treating the development waste by the RO membrane device, it is not necessary to perform pure water washing after washing, and the treatment of the development waste can be performed immediately after the washing step.

As described above, in the second embodiment of the development waste treatment system as the system for treating the TAAH-containing liquid of the present invention, the development waste treatment system has:

(a-2) a liquid tank retaining a development waste produced in a photolithographic process, (b-2) a liquid supply pipe having one end connected to a liquid discharge side of the liquid tank, (c-2) a reverse osmosis membrane device connected to the other end of the liquid supply pipe, (d-2) a concentrated water pipe having one end connected to a concentration side of the reverse osmosis membrane device and supplying concentrated water of the reverse osmosis membrane device to an evaporator, (e-2) a concentrated water return pipe connected to the concentrated water pipe and supplying the concentrated water of the reverse osmosis membrane device to the liquid tank, (f-2) a permeated water pipe having one end connected to a permeation side of the reverse osmosis membrane device, (g-2) a permeated water tank provided in the middle of the permeated water pipe, (h-2) a dilute TAAH effluent treatment facility connected to the other end of the permeated water pipe, and (i-2) a permeated water return pipe connected to the permeated water pipe positioned between the permeated water tank and the dilute TAAH effluent treatment facility and supplying permeated water of the reverse osmosis membrane device to the liquid tank, and in which the washing system is a system washing a reverse osmosis membrane of the reverse osmosis membrane device by supplying a virgin TAAH liquid to the liquid tank and circulating the virgin TAAH liquid in both circulation systems of a circulation system formed by the (a-2) to (d-2) and (e-2) and a circulation system formed by the (a-2) to (c-2), (f-2), (g-2), and (i-2).

Next, as a system for treating a TAAH-containing liquid including a washing system 100 (100C), a preferred embodiment (third embodiment) of a development waste treatment system 1 (10) will be described with reference to the drawing.

Figure 7:
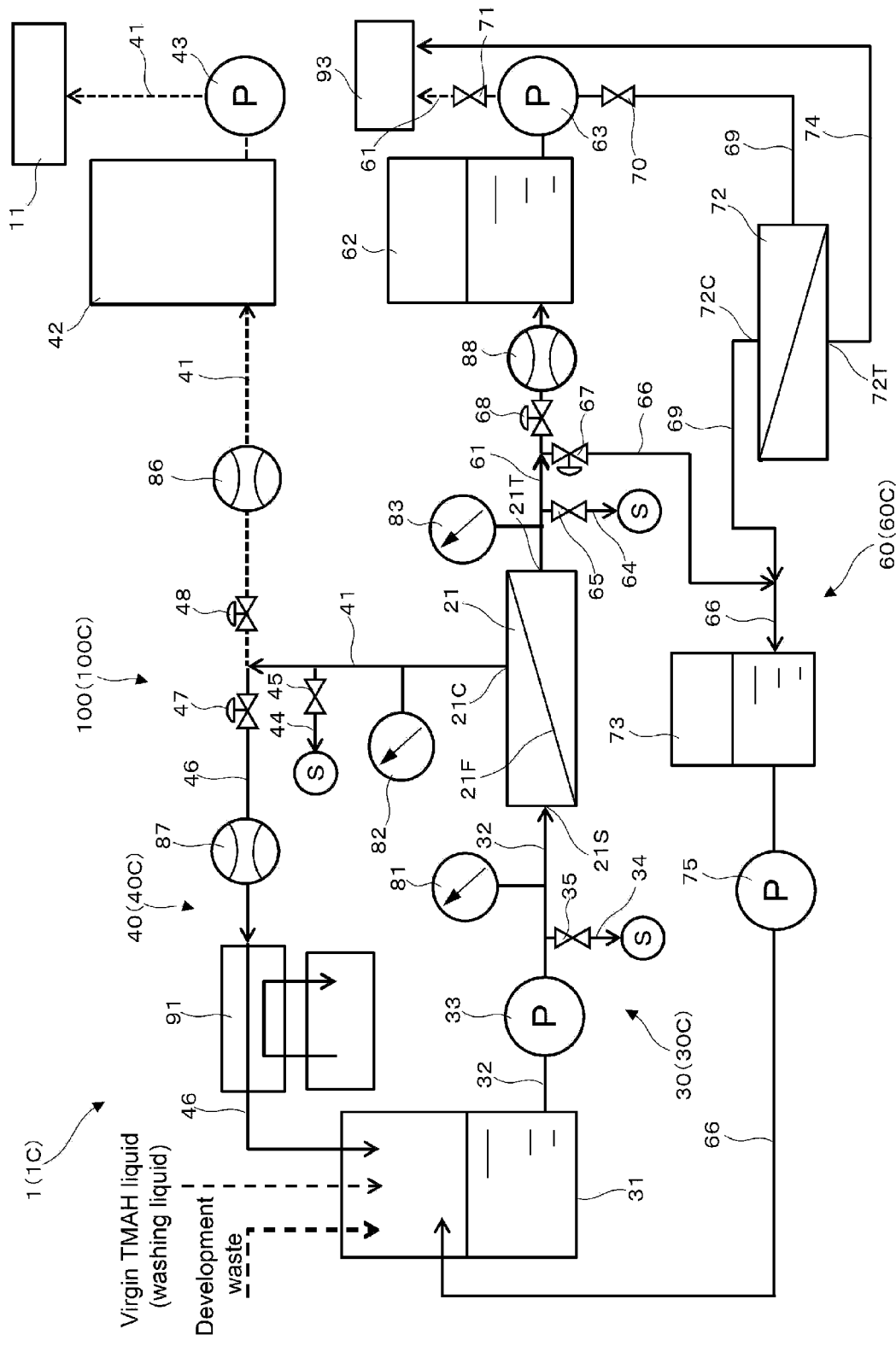
FIG. 7 is a schematic configuration diagram illustrating a preferred embodiment (third embodiment) of a system for treating a TAAH-containing liquid according to the present invention.

As illustrated in FIG. 7, the development waste treatment system 10 mainly has a configuration in which the treatment systems 1A and 1B mentioned above are combined. That is, the another permeated water return pipe 69 connected to the permeated water tank 62 provided in the permeated water pipe 61 is provided. Another RO membrane device 72 concentrating the permeated water in the permeated water tank 62 and a permeated water-concentrated water tank 73 temporarily storing the concentrated water of the another RO membrane device 72 are provided in the another permeated water return pipe 69.

The another permeated water return pipe 69 is connected to the permeated water-concentrated water tank 73 from a concentration side 72C of the another RO membrane device 72. The another permeated water return pipe 69 may be connected directly to the permeated water-concentrated water tank 73, and as illustrated in the drawing, may be connected to the permeated water return pipe 66 on the upstream side of the permeated water-concentrated water tank 73. This permeated water return pipe 66 is preferably the same as the permeated water return pipe 66 of the development waste treatment system 1A mentioned above.

It is preferable that the above-described permeated water-concentrated water tank 73 is provided in this permeated water return pipe 66 and a permeated water transfer means 75 is further provided at the liquid tank 31 side. It is preferable that another permeated water pipe 74 is connected to the dilute TAAH effluent treatment facility 93 at a permeation side 72T of the another RO membrane device 72.

It is preferable that the permeated water return pipe 66 has the valve 67 on the downstream side of divergence of the permeated water return pipe 66. Furthermore, it is preferable that the valve 68 is provided in the permeated water pipe 61 on the downstream side of divergence of the permeated water return pipe 66. In the case of treating the development waste, the valve 68 is opened and the valve 67 is closed. Furthermore, the valve 71 is opened and the valve 70 is closed. On the other hand, in the case of washing, conversely, the valve 67 is opened and the valve 68 is closed. In this way, a permeated water return system 60C (circulation system at the permeation side), which returns to the liquid tank 31 through a washing liquid supply system 30C, the permeation side 21T of the RO membrane device 21, the permeated water pipe 61, the permeated water return pipe 66, and the permeated water-concentrated water tank 73 from the liquid tank 31, is configured.

Other configurations are the same as those in the development waste treatment systems 1A and 1B. Furthermore, the treatment for the development waste is the same as that in the development waste treatment system 1A.

In the above-described washing system 100C, the RO membrane permeated water of the development waste accumulated in the permeated water tank 62 is used as the washing liquid. Therefore, the resist concentration of the washing liquid is, for example, 0.027, and the resist concentration is sufficiently low. Moreover, since the washing liquid is passed through the another RO membrane device 72, the moisture is permeated to the permeation side 72T to increase the TMAH concentration at the concentration side 72C. Therefore, the concentrated water with the increased TMAH concentration is obtained.

Furthermore, it is preferable that, during washing, the washing liquid-permeated water permeated through the RO membrane device 21 is also accumulated in the permeated water tank 62 and is reused as the washing liquid. However, during washing, since the flow rate cannot be sufficiently secured only by the washing liquid-permeated water, it is preferable that the washing liquid-concentrated water obtained by treating the washing liquid with the RO membrane is also returned to the liquid tank 31 and then is reused as the washing liquid. Thereby, the minimum concentrated water amount (washing flow rate) of the RO membrane 21F is secured.

Furthermore, since the washing liquid-concentrated water is concentrated water obtained after passing the washing liquid through the RO membrane device 21, the resist concentration of this concentrated water is significantly lower than that of the concentrated water discharged at the time of development waste treatment. Moreover, since the washing liquid-concentrated water is combined with the washing liquid-permeated water and then is used as the washing liquid, although the resist is contained, the resist concentration thereof is significantly lower than that of the development waste, and thus the washing liquid-concentrated water has a sufficient capability of removing the resist from the surface of the RO membrane 21 (the concentration side 21C of the RO membrane 21F).

As described above, when a concentrated water return system 40C is not provided in the washing system 100C, in order to secure the washing liquid amount, the supply amount of the permeated water from the permeated water tank 62 needs to be increased.

Furthermore, when the washing liquid-concentrated water produced from the concentration side 21C is supplied to the concentrated water tank 42, the concentration of the concentrated water stored in the concentrated water tank 42 is weaker than the concentration of the concentrated water obtained by treating the development waste. Therefore, it is preferable that the entire amount of the concentrated water in the case of washing is returned to the liquid tank 31. By doing this, it is preferable that the supply water amount of the washing liquid to the RO membrane device 21 is secured so that the concentrated water amount equal to or more than the minimum concentrated water amount of the RO membrane 21F can be discharged.

Since the washing is washing using the permeated water obtained by treating the development waste by the RO membrane device 21, it is not necessary to remove the washing liquid in the development waste treatment system 1C and to perform pure water washing, and the treatment of the development waste can be performed immediately after the washing step.

As described above, in the third embodiment of the development waste treatment system as the system for treating the TAAH-containing liquid of the present invention, the development waste treatment system has:

(a-3) a liquid tank retaining a development waste produced in a photolithographic process, (b-3) a liquid supply pipe having one end connected to a liquid discharge side of the liquid tank, (c-3) a reverse osmosis membrane device (Y) connected to the other end of the liquid supply pipe, (d-3) a concentrated water pipe having one end connected to a concentration side of the reverse osmosis membrane device and supplying concentrated water of the reverse osmosis membrane device to an evaporator, (e-3) a concentrated water return pipe connected to the concentrated water pipe and supplying the concentrated water of the reverse osmosis membrane device (Y) to the liquid tank, (f-3) a permeated water pipe (P) having one end connected to a permeation side of the reverse osmosis membrane device (Y), (g-3) a permeated water tank provided in the middle of the permeated water pipe (P), (h-3) a dilute TAAH effluent treatment facility connected to the other end of the permeated water pipe (P), (i-3) a permeated water return pipe (I) connected to the permeated water pipe (P) positioned between the reverse osmosis membrane device (Y) and the permeated water tank and supplying permeated water of the reverse osmosis membrane device (Y) to the liquid tank, (j-3) a permeated water-concentrated water tank provided in the middle of the permeated water return pipe (I), (k-3) another permeated water return pipe (II) diverged from the permeated water pipe (P) positioned between the permeated water tank and the dilute TAAH effluent treatment facility and connected to the permeated water return pipe (I) positioned between the reverse osmosis membrane device (Y) and the permeated water-concentrated water tank, (l-3) another reverse osmosis membrane device (Z) provided in the middle of the another permeated water return pipe (II), and (m-3) another permeated water pipe (Q) connecting a permeation side of the another reverse osmosis membrane device (Z) and the dilute TAAH effluent treatment facility, in which the washing system is a system washing a reverse osmosis membrane of the reverse osmosis membrane device by supplying concentrated water (X) obtained by concentrating permeated water of the reverse osmosis membrane device (Y) in the another reverse osmosis membrane device (Z) to the liquid tank and circulating the concentrated water (X) in both circulation systems of a circulation system formed by the (a-3) to (d-3) and (e-3) and a circulation system formed by the (a-3) to (c-3), (f-3), (i-3), and (j-3).

Next, as a system for treating a TAAH-containing liquid including a washing system 100 (100D), a preferred embodiment (fourth embodiment) of a development waste treatment system 1 (1D) will be described with reference to the drawing.

Figure 8:
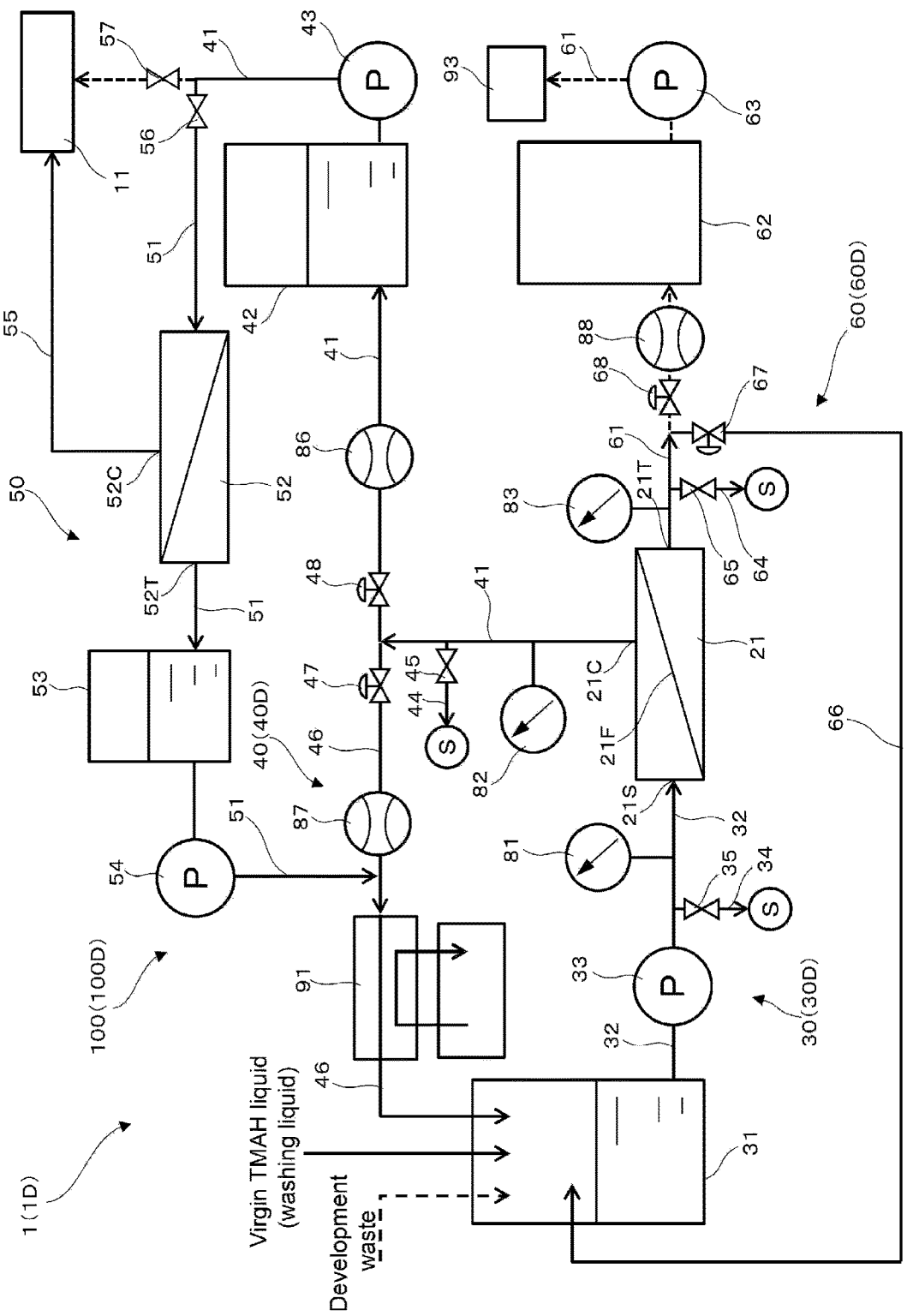
FIG. 8 is a schematic configuration diagram illustrating a preferred embodiment (fourth embodiment) of a system for treating a TAAH-containing liquid according to the present invention.

As illustrated in FIG. 8, the development waste treatment system 1D has a configuration in which a concentrated water permeation system 50 supplying the concentrated water of the concentrated water tank 42 to the concentrated water return pipe 46 is assembled in a concentrated water return system 40D similar to the concentrated water return system 40A of the development waste treatment system 1A mentioned above. That is, it is preferable that the concentrated water permeation pipe 51 of the concentrated water permeation system 50 is diverged from the concentrated water pipe 41 between the concentrated water transfer means 43 and the evaporator 11 and is connected to the concentrated water return pipe 46 between the cooler 91 and the flow meter 87.

It is preferable that a nanofiltration (NF) device 52, an NF permeated water tank 53, and an NF permeated water transfer means 54 are provided in the concentrated water permeation pipe 51 in order from the diverging side of the concentrated water pipe 41. Furthermore, it is preferable that the concentrated water permeation pipe 51 is connected to the permeation side of the NF device 52 and a concentrated water pipe 55 connected to the evaporator 11 is connected to the concentration side 21C of the NF device 52.

It is preferable that a valve 56 is provided on the diverging side of the concentrated water pipe 41 in the concentrated water permeation pipe 51 and a valve 57 is provided on the evaporator 11 side in relation to the diverging point of the concentrated water permeation pipe 51 in the concentrated water pipe 41.

In this way, a concentrated water return system 40D (concentrated water circulation system), which returns to the liquid tank 31 through a washing liquid supply system 30D, the concentration side 21C of the RO membrane device 21, the concentrated water pipe 41, and the concentrated water return pipe 46 from the liquid tank 31, is configured.

Other configurations are the same as that in the development waste treatment system 1A. Furthermore, the treatment for the development waste is the same as that in the development waste treatment system 1A.

In the case of washing in the above-described washing system 100D, similarly to the washing system 100A, it is preferable that all of the liquids in the washing system 100D are first removed, and then the virgin TMAH liquid is supplied as the washing liquid in the liquid tank 31. At the time of washing, the valve 47 and the valve 48 on the concentration side are opened. The opening amount is appropriately adjusted. In addition, the valve 57 is closed and the valve 56 is opened. At the same time, the valve 68 on the permeation side is closed and the valve 67 is opened.

In the above-described washing system 100D, since the virgin TMAH liquid is used as the washing liquid, the TMAH concentration is high (for example, 2.38% by mass) and the resist washability of the RO membrane 21F is excellent. However, since the flow rate of the washing liquid including only the virgin TMAH liquid is insufficient, the washing liquid-permeated water discharged from the RO membrane device 21 is used, and the washing liquid-concentrated water discharged from the RO membrane device 21 is also used. Some of the washing liquid-concentrated water is returned to the liquid tank 31 without any changes by the concentrated water return system 40D, but the remaining part is accumulated in the concentrated water layer 42. The washing liquid-concentrated water accumulated in the concentrated water tank 42 is passed through the NF device 52. In the NF device 52, the resist is removed, and the TMAH aqueous solution is permeated, supplied to the concentrated water pipe 46 from the concentrated water permeation pipe 51, and sent to the liquid tank 31. Therefore, a liquid having a low resist concentration (for example, resist concentration: 0.012) and a TMAH concentration increased by the RO membrane device 21 (for example, TMAH concentration: 2.21% by mass) is supplied to the liquid tank 31. Thus, even when some of the washing liquid-concentrated water is supplied directly to the liquid tank 31, the resist concentration becomes weak and the TMAH concentration becomes high. In the above-described system, since TMAH almost remains without being removed and the resist is removed by the NF device 52, the resist concentration becomes lower (for example, 1/99 or less) than that in a case where the entire amount of the aforementioned washing liquid-concentrated water is returned to the liquid tank 31. As described above, since the flow rate of the washing liquid cannot be sufficiently secured only by the washing liquid-permeated water, the washing liquid-concentrated water obtained by treating the washing liquid with the RO membrane is also returned to the liquid tank 31 and then is reused as the washing liquid. Thereby, the minimum concentrated water amount (washing flow rate) of the RO membrane 21F is secured.

Incidentally, since the washing liquid-concentrated water is concentrated water obtained after passing the virgin TMAH liquid through the RO membrane device 21, the resist concentration of this concentrated water is lower than that of the concentrated water discharged at the time of development waste treatment. Therefore, the washing liquid obtained by combining the permeated water and the concentrated water has a sufficiently low resist concentration and thus has a capability of removing the resist from the surface of the reverse osmosis membrane.

Since the washing is washing using a virgin TMAH liquid, it is not necessary to remove the washing liquid in the development waste treatment system 1D and to perform pure water washing, and the treatment of the development waste can be performed immediately after the washing step.

As described above, in the fourth embodiment of the development waste treatment system as the system for treating the TAAH-containing liquid of the present invention, the development waste treatment system has:

(a-4) a liquid tank retaining a development waste produced in a photolithographic process, (b-4) a liquid supply pipe having one end connected to a liquid discharge side of the liquid tank, (c-4) a reverse osmosis membrane device connected to the other end of the liquid supply pipe, (d-4) a concentrated water pipe having one end connected to a concentration side of the reverse osmosis membrane device, (e-4) a concentrated water tank provided in the middle of the concentrated water pipe, (f-4) a concentrated water return pipe connected to the concentrated water pipe positioned between the reverse osmosis membrane and the concentrated water tank and supplying the concentrated water of the reverse osmosis membrane device to the liquid tank, (g-4) a concentrated water permeation pipe diverged from the concentrated water pipe positioned between the concentrated water tank and the evaporator and connected to the concentrated water return pipe, (h-4) a nanofiltration membrane device provided in the middle of the concentrated water permeation pipe, (i-4) a nanofiltration membrane permeated water tank provided in the middle of the concentrated water permeation pipe and retaining permeated water of the nanofiltration membrane device, (j-4) a nanofiltration membrane concentrated water pipe having one end connected to a concentration side of the nanofiltration membrane device and supplying concentrated water of the nanofiltration membrane device to the evaporator, (k-4) a permeated water pipe having one end connected to a permeation side of the reverse osmosis membrane device, (l-4) a dilute TAAH effluent treatment facility connected to the other end of the permeated water pipe, and (m-4) a permeated water return pipe connected to the permeated water pipe and supplying the permeated water to the liquid tank, and in which the washing system is a system washing a reverse osmosis membrane of the reverse osmosis membrane device by supplying a virgin TMAH liquid to the liquid tank and circulating the virgin TMAH liquid in both circulation systems of a circulation system formed by the (a-4) to (e-4) and (f-4) to (i-4) and a circulation system formed by the (a-4) to (c-4), (k-4), and (m-4).

Next, as a system for treating a TAAH-containing liquid including a washing system 100 (100E), a preferred embodiment (fifth embodiment) of a development waste treatment system 1 (1E) will be described with reference to the drawing.

Figure 9:
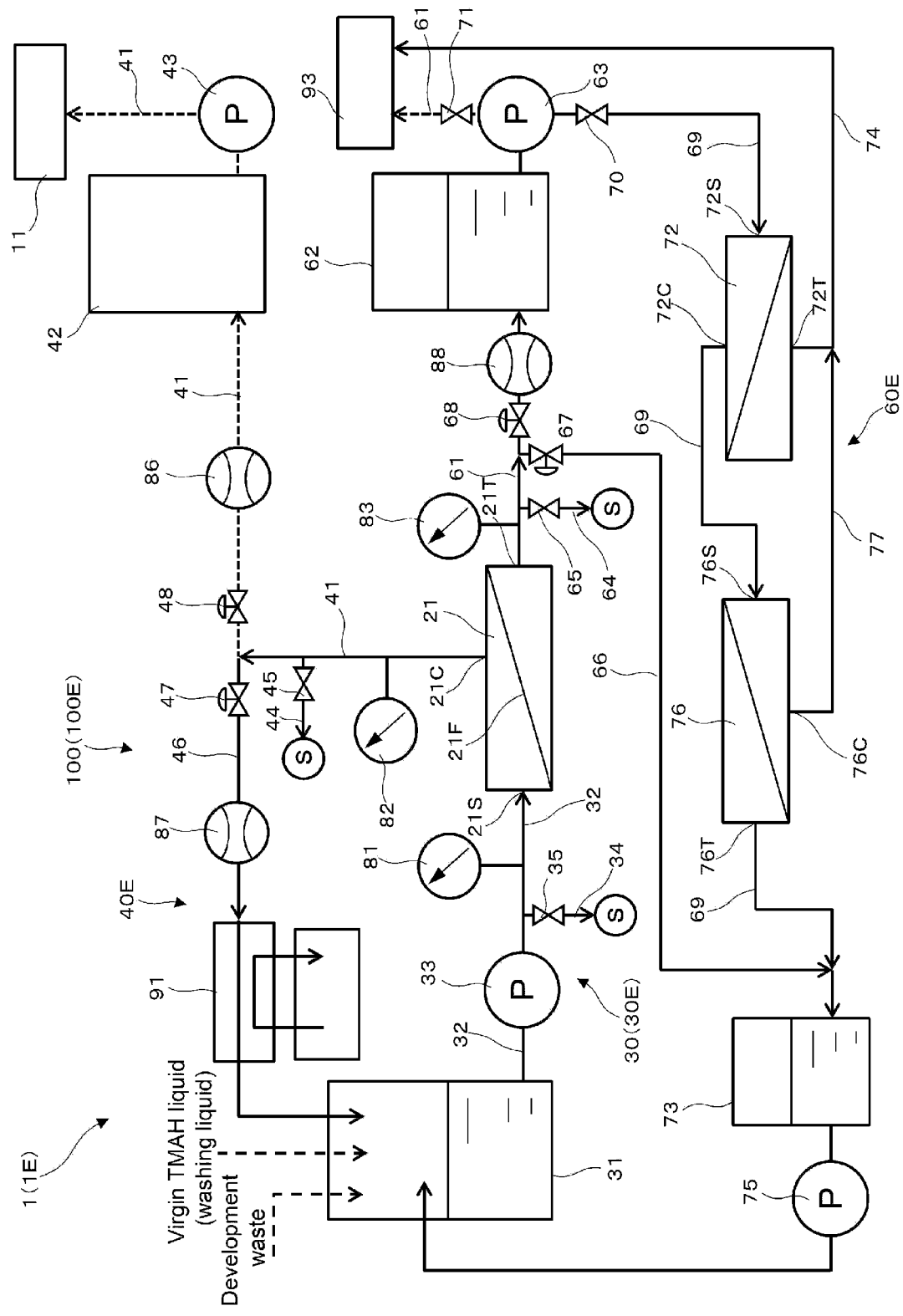
FIG. 9 is a schematic configuration diagram illustrating a preferred embodiment (third embodiment) of a system for treating a TAAH-containing liquid according to the present invention.

As illustrated in FIG. 9, in the development waste treatment system 1E, another RO membrane device 72 and an NF device 76 are provided in order from the permeated water transfer means 63 side in the another permeated water return pipe 69 between the permeated water transfer means 63 and the permeated water-concentrated water tank 73 in the aforementioned development waste treatment system 1C.

It is preferable that the another permeated water return pipe 69 supplying the permeated water in the permeated water tank 62 is connected to a water supply side 72S of the another RO membrane device 72, and the another permeated water return pipe 69 is connected from a concentration side 72C of the another RO membrane device 72 to a water supply side 76S of the above-described NF device 76. It is preferable that the another permeated water pipe 74 is connected to the dilute TAAH effluent treatment facility 93 at the permeation side 72T of the another RO membrane device 72. Further, it is preferable that the another permeated water return pipe 69 is connected from a permeation side 76T of the NF device 76 to the above-described permeated water concentration tank 73. It is preferable that a concentration side 76C of the NF device 76 is connected to the another permeated water pipe 74 via another concentrated water pipe 77.

The another permeated water return pipe 69 may be connected to the permeated water-concentrated water tank 73 via the permeated water return pipe 66 as illustrated in the drawing.

In this way, a permeated water return system 60E (circulation system at the concentration side), which returns to the liquid tank 31 through a washing liquid supply system 30E, the permeation side 21T of the RO membrane device 21, the permeated water pipe 61, the permeated water return pipe 66, and the permeated water-concentrated water tank 73 from the liquid tank 31, is configured.

Other configurations are the same as that in the development waste treatment system 1C. It is preferable to perform the valve operation similarly to the development waste treatment system 1A in order to treat the development waste using the development waste treatment system 1E. Furthermore, it is preferable that, at the time of washing, in order to send the permeated water from the permeated water tank 62 in which the permeated water of the development pipe is accumulated to the liquid tank 31, the valve 71 is closed and the valve 70 is opened. Further, it is preferable that, after permeated water of an NF membrane device 76 is accumulated in the permeated water-concentrated water tank 73, the valve 68 is closed again, and the valve 67 is opened.

In the above-described washing system 100E, it is preferable to use, as the washing liquid, permeated water obtained by passing the permeated water of the development waste accumulated in the permeated water tank 62 through the another RO membrane device 72 and further passing the concentrated water thereof through the NF filter device 76. Therefore, the moisture of the permeated water of the development waste liquid is discharged to the permeation side by the RO membrane device 72 and TMAH remains at the concentration side, so that the TMAH concentration is increased. Furthermore, the liquid with this increased TMAH concentration is passed through the NF filter device 76, so that TMAH is permeated and the resist is removed. Therefore, in the permeated water-concentrated water tank 73, the washing liquid is supplied as the liquid in which the TMAH concentration is increased and the resist concentration is lowered. The resist concentration of this washing liquid is, for example, 0.001, and the resist concentration is sufficiently low. Furthermore, by passing the washing liquid through the another RO membrane device 72, the TMAH concentration is enhanced, and thus an excessive decrease in TMAH concentration can be suppressed. Since the flow rate of the washing liquid cannot be sufficiently secured only by the permeated water of the development waste, it is preferable that the washing liquid-concentrated water obtained by treating the washing liquid with the RO membrane is also returned to the liquid tank 31 and then is reused as the washing liquid. Thereby, the minimum concentrated water amount (washing flow rate) of the RO membrane 21F is secured.

Furthermore, since the washing liquid-concentrated water is concentrated water obtained after passing the washing liquid through the RO membrane device 21, the resist concentration of this concentrated water is lower than that of the concentrated water discharged at the time of development waste treatment. Moreover, since the washing liquid-concentrated water is combined with the washing liquid-permeated water and then is used as the washing liquid, although the resist is contained, the resist concentration thereof is significantly lower than that of the development waste, and thus the washing liquid-concentrated water has a sufficient capability of removing the resist from the surface of the reverse osmosis membrane.

As described above, when a concentrated water return system 40E is not provided in the washing system 100E, in order to secure the washing liquid amount, the supply amount of the permeated water from the permeated water tank 62 needs to be increased.

Furthermore, when the washing liquid-concentrated water produced from the concentration side 21C is supplied to the concentrated water tank 42, at the time of treating the development waste after washing, the concentration of the concentrated water accumulated in the concentrated water tank 42 is attenuated. Therefore, it is preferable that the entire amount of the concentrated water in the case of washing is returned to the liquid tank 31. By doing this, it is preferable that the supply water amount of the washing liquid to the RO membrane device 21 is secured so that the concentrated water amount equal to or more than the minimum concentrated water amount of the RO membrane 21F can be discharged.

Since the washing is washing using the permeated water obtained by treating the development waste by the RO membrane device 21, it is not necessary to remove the washing liquid in the development waste treatment system 1E of the development waste and to perform pure water washing, and the treatment of the development waste can be performed immediately after the washing step.

As described above, in the fifth embodiment of the development waste treatment system as the system for treating the TAAH-containing liquid of the present invention, the development waste treatment system has:

(a-5) a liquid tank retaining a development waste produced in a photolithographic process,
(b-5) a liquid supply pipe having one end connected to a liquid discharge side of the liquid tank,
(c-5) a reverse osmosis membrane device (Y) connected to the other end of the liquid supply pipe,
(d-5) a concentrated water pipe having one end connected to a concentration side of the reverse osmosis membrane device and supplying concentrated water of the reverse osmosis membrane device to an evaporator,
(e-5) a concentrated water return pipe connected to the concentrated water pipe and supplying the concentrated water of the reverse osmosis membrane device (Y) to the liquid tank,
(f-5) a permeated water pipe (P) having one end connected to a permeation side of the reverse osmosis membrane device (Y),
(g-5) a permeated water tank provided in the middle of the permeated water pipe (P),
(h-5) a dilute TAAH effluent treatment facility connected to the other end of the permeated water pipe (P),
(i-5) a permeated water return pipe (I) connected to the permeated water pipe (P) positioned between the reverse osmosis membrane device (Y) and the permeated water tank and supplying permeated water of the reverse osmosis membrane device (Y) to the liquid tank,
(j-5) a permeated water-concentrated water tank provided in the middle of the permeated water return pipe (I),
(k-5) another permeated water return pipe (II) diverged from the permeated water pipe (P) positioned between the permeated water tank and the dilute TAAH effluent treatment facility and connected to the permeated water return pipe (I) positioned between the reverse osmosis membrane device (Y) and the permeated water-concentrated water tank,
(l-5) another reverse osmosis membrane device (Z) provided in the middle of the another permeated water return pipe (II),
(m-5) a nanofiltration membrane device provided in the middle of the another permeated water return pipe (II) and treating concentrated water of the another reverse osmosis membrane device (Z),
(n-5) another permeated water pipe (Q) connecting a permeation side of the another reverse osmosis membrane device (Z) and the dilute TAAH effluent treatment facility, and
(o-5) a nanofiltration membrane concentrated water pipe connecting a concentration side of the nanofiltration membrane device and the another permeated water pipe (Q), in which the washing system is a system washing a reverse osmosis membrane of the reverse osmosis membrane device by supplying permeated water-treated water, which is obtained by concentrating permeated water of the reverse osmosis membrane device (Y) in the another reverse osmosis membrane device (Z) and further permeating the concentrated permeated water through the nanofiltration membrane device, to the liquid tank and circulating the permeated water-treated water in both circulation systems of a circulation system formed by the (a-5) to (d-5) and (e-5) and a circulation system formed by the (a-5) to (c-5), (f-5), and (i-5).

In each of the above-described development waste treatment systems 1B to 1E, in the case of performing the treatment of the development waste, similarly to the above-described development waste treatment system 1A, the development waste is supplied to the liquid tank 31 and is sent to the RO membrane device 21 through the liquid supply pipe 32. The development waste is separated into concentrated water and permeated water by the RO membrane device 21. Some of this concentrated water is passed through the concentrated water return system 40, is cooled by the cooler 91, and then is returned to the liquid tank 31. On the other hand, the remaining concentrated water is guided to the concentrated water tank 42 through the concentrated water pipe 41 and is sent to the evaporator 11. It is preferable that, in the treatment of the development waste, by the valve operation, the development waste is caused not to flow into the washing liquid system side. For example, it is preferable that the valve 67 is closed in the treatment system 1A, the valve 70 is closed in the treatment system 1B, the valves 67 and 70 are closed in the treatment systems 1C and 1E, and the valves 56 and 67 are closed in the treatment system 1D.

Regarding the above-described development waste treatment system 1A, an example of the mass balance has been described, but also regarding the other development waste treatment systems 1B to 1E, the mass balance can be appropriately set according to the membrane usage of the RO membrane, the NF membrane, and the like.

It is preferable that each of the above-described development waste treatment systems 1A to 1E has a means for measuring the resist concentration of the washing liquid supplied from the liquid tank 31 by the washing systems 100A to 100E. For example, it is preferable that a sample is acquired from the collection pipe 34, and the resist concentration of this sample is measured by absorptiometry, for example, using the aforementioned spectrophotometer. Further, it is preferable to include a washing state detection means (not illustrated) for detecting a washing state from the measured resist concentration. This washing state detection means is to determine on whether or not the washing step is performed, for example, by comparing the above-described measurement value of the resist concentration with a threshold of the resist concentration at which the washing is necessary.

Regarding the above-described development waste treatment systems 1A to 1E, it is preferable to detect the state of membrane clogging of the RO membrane 21F of the RO membrane device 21 by measuring any one or more of the treatment water amount, the permeated water amount, the operating pressure, the intermembrane pressure difference (a difference between the pressure at the water supply side and the pressure at the permeation side) of the RO membrane device 21.

As for the detection method, the treatment water amount of the RO membrane device 21 is obtained from the total value of the flow rates measured by the flow meters 86 to 88. The permeated water amount is measured by the flow meter 88. Furthermore, the operating pressure is measured by the pressure gauge 81. The intermembrane pressure difference (a difference between the pressure at the water supply side and the pressure at the permeation side) is measured by the pressure gauges 81 and 83 and the differential pressure thereof is obtained.

It is preferable that, in the above-described development waste treatment systems 1A to 1E, whether or not the process proceeds to the washing step of the RO membrane device 21 is determined from the detected membrane clogging state of the RO membrane 21F, and in a case where the process needs to proceed to the washing step, the process proceeds to the washing step of the RO membrane device.

In determination on whether or not the process proceeds to the washing step, it is preferable that the process proceeds to the washing step in at least any case of a case where the treatment amount reaches about 60% by mass of the initial state, a case where the permeated water amount reaches about 60% by mass of the initial state, a case where the operating pressure reaches about 1.8 MPa mass %, and a case where the intermembrane pressure difference reaches about 1.8 MPa.

In the above-described development waste treatment systems 1A and 1B, the virgin TMAH liquid is used as the washing liquid. However, in the development waste treatment systems 10 and 1E, the concentrated water containing TMAH is stored in the permeated water-concentrated water tank 73, and in the development waste treatment system 1D, the permeated water containing TMAH is stored in the NF permeated water tank 53. This stored liquid can be used as the washing liquid. Therefore, the amount of the virgin TMAH liquid used is sufficient to be small as compared to the development waste treatment systems 1A and 1B. Furthermore, in the development waste treatment systems 1C to 1E, aiming at recovering TMAH in the waste as much as possible and using the recovered TMAH as the washing liquid, this is achieved. Incidentally, it is a matter of course that the virgin TMAH liquid can be used also in the development waste treatment systems 1C to 1E.

The RO membrane device and the NF membrane device described above have a single-stage configuration, but may have a multi-stage configuration. In this case, both in the cases of the RO membrane and the NF membrane, disposition in a multi-stage manner in series is preferred. At least one stage of a multi-stage RO membrane device is preferably a high-pressure RO membrane device.

EXAMPLES

Example 1

In Example 1, the concentration treatment of the development waste and the washing of the water supply side 21F of the RO membrane 21F were performed using the development waste treatment system 1A as illustrated in FIG. 1. SWC5 membrane manufactured by Nitto Denko Corporation (4 inch, membrane area: 37.1 m$^2$) was used as the RO membrane 21F of the RO membrane device 21. Incidentally, it can be confirmed that this RO membrane (SWC5) does not have a problem in membrane usage including the material even in the continuous operation for 3620 hours (about 150 days) in a continuous test at about pH 12, as mentioned above.

Figure 2:
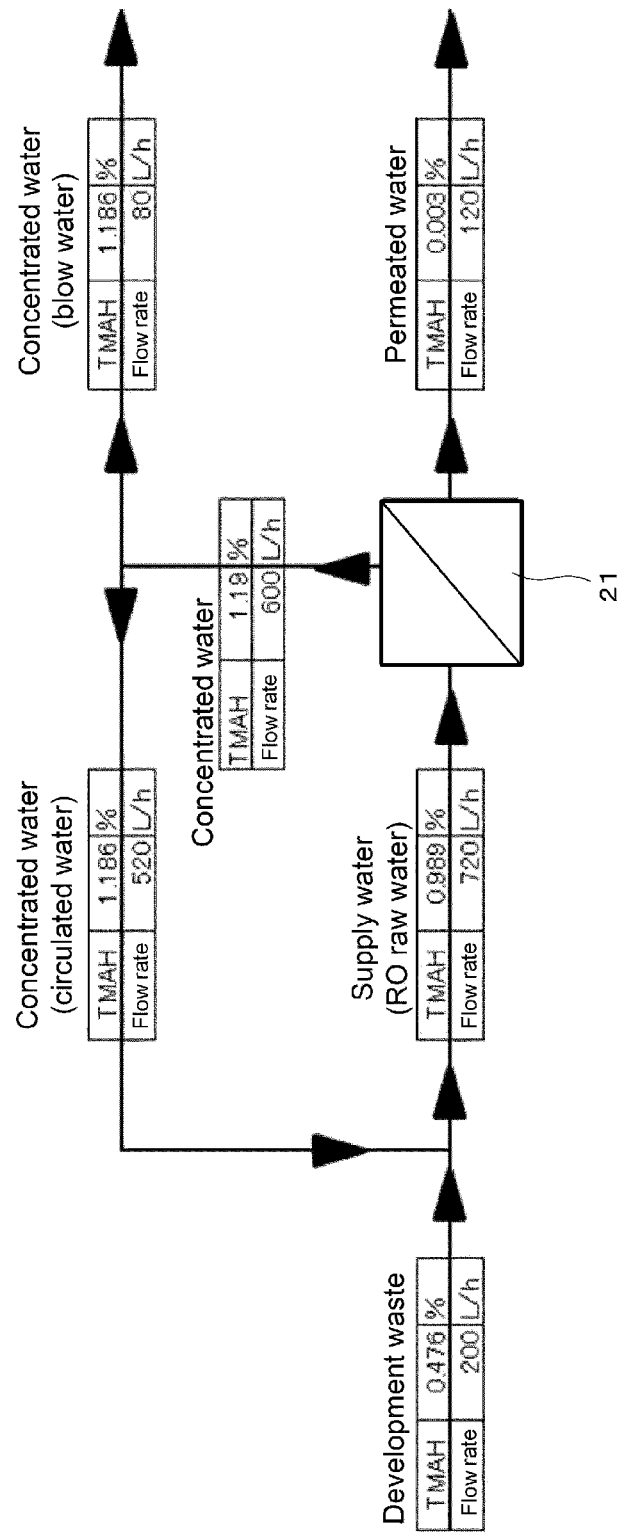
FIG. 2 is a mass balance view illustrating a preferred example of a mass balance at the time of a TAAH-containing liquid (development waste) treatment in the TAAH-containing liquid treatment system of the first embodiment.

The mass balance at the time of treating the development waste was set to be the same as illustrated in FIG. 2 mentioned above by adjusting the opening degree of the valves 47 and 48.

Therefore, the case of treating the development waste, the valves 47 and 48 were opened while adjusting the opening degree, the valve 68 was opened, and the valve 67 was closed. On the other hand, in the case of the washing step, the valve 47 was opened, the valve 48 was closed, the valve 67 was opened, and the valve 68 was closed. The treatment of the development waste was continuously performed in this state, and a single washing step was performed at the time when the permeate flux approached to 0.4 m/d. The treatment of the development waste for approximately 1200 hours was performed three times, and the washing step was performed two times during this treatment of the development waste. The single washing step was performed for 4.75 hours, combined with development waste extraction time, washing liquid injection time, washing time, and washing liquid extraction time.

Development waste actually discharged in semiconductor manufacturing was used as the development waste. The operating pressure was set to 1.8 MPa or more.

The treatment conditions were set as described above, and the treatment of the development waste was performed.

Samples were collected from the respective collection pipes 34, 44, and 64 at the supply side, the concentration side, and the permeation side of the RO membrane device 21, and the pH, the TMAH concentration, and the resist concentration (absorbance at 290 nm) of each test liquid (development waste, RO membrane supply water, RO membrane concentrated water, and RO membrane permeated water) were obtained. The results thereof are shown in Table 1.

The relationship between the elapsed time of the development waste treatment and the permeate flux (m/d) is shown in FIG. 3. As the treatment of the development waste proceeded, the permeate flux was lowered. The process proceeded to the washing step at the time point when the permeate flux was around 0.4 m/d, and the washing of the RO membrane was executed. Incidentally, setting of washing timing may be arbitrary.

As a result of performing the washing step, as shown in FIG. 3, both the permeate flux and the operating pressure were recovered to the initial state. The initial state refers to a state immediately before the treatment of the development waste is started. Furthermore, even when the concentration treatment of the development waste and the washing step were repeatedly performed, both the permeate flux and the operating pressure were recovered to the initial state every time the washing step was performed. In this way, by periodically performing the washing step, the treatment capacity of the RO membrane 21F could be recovered, and the lifetime of the RO membrane 21F could be extended.

As for the washing liquid, a virgin TMAH developer having a TMAH concentration of 2.50% by mass was used as the virgin TMAH liquid. The virgin TMAH developer is an unused TMAH developer to be used in the development step of the photoresist. As shown in Table 2 mentioned above, for example, after 0.25 hours from the start of the washing, the development waste having a weak TMAH concentration which remained in the system was mixed so that the TMAH concentration was lowered to 2.20% by mass. For example, mixing of the permeated water having a low TMAH concentration is considered. After the TMAH concentration was lowered, the TMAH concentration was stabilized almost to the lowered value.

Since the washing liquid obtained after washing contains TMAH, the resist, and water, the washing liquid can be caused to flow to the concentrated water tank without any changes after the washing step.

Comparative Example 1

In Comparative Example 1, the treatment of the development waste was performed in the same manner as in Example 1, except that the washing step was not performed. Therefore, the pH, the TMAH concentration, and the resist concentration (absorbance at 290 nm) of development waste, RO membrane supply water, RO membrane concentrated water, and RO membrane permeated water collected from the respective collection pipes 34, 44, and 64 at the supply side, the concentration side, and the permeation side of the RO membrane device 21 were the same values as those in Example 1.

The relationship between the elapsed time of the development waste treatment and the permeate flux (m/d) is shown in FIG. 3. As the treatment of the development waste proceeded, the permeate flux was lowered. At the time point when the permeate flux was around 0.4 m/d, a change in permeate flux became small. Regarding the operating pressure, at the time point when the operating pressure was around 1.8 MPa, a change in operating pressure became small.

In this way, when the washing step was not performed, the treatment capacity of the RO membrane 21F could not be recovered, and it was necessary to exchange the RO membrane 21F.

Comparative Example 2

Washing was performed in the same manner as in Example 1, except that a 2.5% by mass sodium hydroxide (NaOH) aqueous solution was used as the washing liquid, and thus, the washing time was set to 4 hours. Regarding the permeate flux before and after washing, the permeate flux before washing was 0.422 m/d, and the permeate flux after washing was 0.685 m/d. The same result as in the case of TMAH washing was obtained even in the case of washing with a 2.5% by mass NaOH aqueous solution in this way. However, the permeate flux was returned, but pure water washing for removing NaOH was required. The pure water washing was executed until the sodium concentration became 0.005% by mass or less that was equal to the development waste such that sodium ions did not affect the recovered TMAH (see Table 4 and FIG. 5 mentioned above). The pure water washing was performed while leaving pure water running in the system.

Regarding the washing time, 0.25 hours, 0.25 hours, 4 hours, 0.25 hours, 0.25 hours, 10 hours, and 0.25 hours were taken for development waste extraction, washing liquid injection, washing, washing liquid extraction, pure water injection, pure water washing of the system inside, and pure water washing liquid extraction, respectively, and the washing time of 15.25 hours in total was required (see Table 3 mentioned above).

As a result, it was found that, in the case of washing using TMAH by the development waste treatment system of the present invention, the number of times of the washing step is less, the washing time is short, and washing can be efficiently performed at low costs.

Examples 2 to 5

In Example 2, the concentration treatment of the development waste and the washing step of the RO membrane 21 were performed using the development waste treatment system 1B as illustrated in FIG. 6. As for the washing liquid, a virgin TMAH developer was used as the virgin TMAH liquid. The other conditions are the same as in Example 1.

In Example 3, the concentration treatment of the development waste and the washing step of the RO membrane 21 were performed using the development waste treatment system 1C as illustrated in FIG. 7. As the washing liquid, concentrated water obtained by concentrating the permeated water of the development waste permeated through the RO membrane device 21 by the another RO membrane device 72 was used. The other conditions are the same as in Example 1.

In Example 4, the concentration treatment of the development waste and the washing step of the RO membrane 21 were performed using the development waste treatment system 1D as illustrated in FIG. 8. As for the washing liquid, a virgin TMAH developer was used as the virgin TMAH liquid. The other conditions are the same as in Example 1.

In Example 5, the concentration treatment of the development waste and the washing step of the RO membrane 21 were performed using the development waste treatment system 1E as illustrated in FIG. 9. As the washing liquid, permeated water obtained by concentrating the permeated water of the development waste permeated through the RO membrane device 21 by the another RO membrane device 72 and permeating the concentrated water through the NF membrane device 76 was used. The other conditions are the same as in Example 1.

As for the NF membrane in Examples 4 and 5, NF type NTR•7450 manufactured by Nitto Denko Corporation was used.

The results of washing of each of Examples 1 to 5 are shown in Table 5.

As shown in Table 5, in Examples 1 to 5, the TMAH concentration of the washing liquid was 2.20 to 2.38. The concentration in all cases was a TMAH concentration sufficient for washing the resist of the RO membrane 21F. Furthermore, the resist concentration immediately before the washing liquid was supplied to the RO membrane 21F was 0.000 to 0.027 and these concentrations all were sufficiently low values.

The permeate flux was recovered to 0.68 to 0.70 after washing.

Regarding this recovery rate, any liquid was almost recovered at 97% or more, and the TMAH washing by the development waste treatment system of the present invention was effective.

TABLE 5

|  | Washing liquid | TMAH concentration (mass %) | Resist concentration (absorbance at 290 nm) | Permeate flux (m/d) Before washing | Permeate flux (m/d) After washing | Recovery rate (%) (initial stage: 0.7 m/d) |
|---|---|---|---|---|---|---|
| Ex. 1 | Virgin TMAH developer | 2.38 | 0.000 | 0.41 | 0.70 | 100 |
| Ex. 2 | Virgin TMAH developer | 2.38 | 0.002 | 0.42 | 0.70 | 100 |
| Ex. 3 | Concentrated water obtained by concentrating development waste-permeated water of RO membrane device 21 by RO membrane device 72 | 2.22 | 0.027 | 0.40 | 0.68 | 97 |
| Ex. 4 | Virgin TMAH developer | 2.21 | 0.012 | 0.39 | 0.69 | 99 |
| Ex. 5 | Development waste-permeated water of RO membrane device 21 → concentration by RO membrane device 72 → permeated water permeated through NF membrane device 76 | 2.20 | 0.001 | 0.40 | 0.70 | 100 |

Remarks: 'Ex.' means Example according to this invention.

Having described the invention as related to Examples thereof, it is our intention that the present invention not be limited by any of the details of the description, unless otherwise specified, but rather be construed broadly within its spirit and scope as set out in the accompanying claims.

This application claims priority on Patent Application No. 2018-197694 filed in Japan on Oct. 19, 2018, which is entirely herein incorporated by reference.

REFERENCE SIGNS LIST 1, 1A, 1B, 1C, 1D, 1E TAAH-containing liquid treatment system
11 Evaporator
21 Reverse osmosis membrane device (RO membrane device)
21F RO membrane
21S Water supply side
21C Concentration side
21T Permeation side
30 Liquid-to-be-treated supply system
30A Washing liquid supply system
31 Liquid tank
32 Liquid supply pipe
33 Liquid transfer means
34 Liquid collection pipe (collection pipe)
35, 45, 47, 48, 56, 65, 67, 68, 70, 71 Valve
40, 40A, 40B, 40C, 40D, 40E Concentrated water return system
41 Concentrated water pipe
42 Concentrated water tank
43 Concentrated water transfer means
44 Concentrated water collection pipe
46 Concentrated water return pipe
50 Concentrated water permeation system
51 Concentrated water permeation pipe
52 NF device
53 NF permeated water tank
54 NF permeated water transfer means
55 Concentrated water pipe
60, 60A, 60B, 60C, 60D, 60E Permeated water return system
61 Permeated water pipe
62 Permeated water tank
63 Permeated water transfer means
64 Permeated water collection pipe (collection pipe)
66 Permeated water return pipe
67, 68 Flow meter
69 Permeated water return pipe, another permeated water return pipe
71, 86, 87, 88 Flow meter
72 Another RO membrane device
72S Water supply side
72C Concentration side
72T Permeation side
73 Permeated water-concentrated water tank
74 Another permeated water pipe
75 Permeated water transfer means
76 NF device
77 Another concentrated water pipe
81, 82, 83 Pressure gauge
86, 87, 88 Flow meter
91 Cooler
93 Dilute TAAH effluent treatment facility
100, 100A, 100B, 100C, 100D, 100E Washing system

The invention claimed is:

1. A system for treating a tetraalkylammonium hydroxide-containing liquid, comprising:
a high-pressure type reverse osmosis membrane device concentrating a liquid to be treated containing tetraalkylammonium hydroxide at a concentration side; and
a line for supplying the concentrated liquid to be treated by the reverse osmosis membrane device to an evaporator further concentrating the concentrated liquid to be treated,
wherein a part of the system for treating a tetraalkylammonium hydroxide-containing liquid is capable of being used as a circulation system configured by including the reverse osmosis membrane device, and
wherein the circulation system is usable as a washing system washing a reverse osmosis membrane of the reverse osmosis membrane device by circulating a washing liquid containing tetraalkylammonium hydroxide in the circulation system,
the system for treating a tetraalkylammonium hydroxide-containing liquid further comprising
(a-2) a liquid tank retaining a tetraalkylammonium hydroxide-containing liquid,
(b-2) a liquid supply pipe having one end connected to a liquid discharge side of the liquid tank, (c-2) a reverse osmosis membrane device connected to the other end of the liquid supply pipe, (d-2) a concentrated water pipe having one end connected to a concentration side of the reverse osmosis membrane device and supplying concentrated water of the reverse osmosis membrane device to an evaporator, (e-2) a concentrated water return pipe connected to the concentrated water pipe and supplying the concentrated water of the reverse osmosis membrane device to the liquid tank, (f-2) a permeated water pipe having one end connected to a permeation side of the reverse osmosis membrane device, (g-2) a permeated water tank provided in the middle of the permeated water pipe, (h-2) a dilute tetraalkylammonium hydroxide effluent treatment facility connected to the other end of the permeated water pipe, and (i-2) a permeated water return pipe connected to the permeated water pipe positioned between the permeated water tank and the dilute tetraalkylammonium hydroxide effluent treatment facility and supplying permeated water of the reverse osmosis membrane device to the liquid tank, wherein the washing system is a system washing the reverse osmosis membrane of the reverse osmosis membrane device by supplying a virgin tetraalkylammonium hydroxide liquid to the liquid tank and circulating the virgin tetraalkylammonium hydroxide liquid in both circulation systems of a circulation system formed by the (a-2) to (d-2) and (e-2) and a circulation system formed by the (a-2) to (c-2), (f-2), (g-2), and (i-2).

2. The system for treating a tetraalkylammonium hydroxide-containing liquid according to claim 1, comprising a washing system washing the reverse osmosis membrane device with a washing liquid containing tetraalkylammonium hydroxide.

3. The system for treating a tetraalkylammonium hydroxide-containing liquid according to claim 1, comprising:
an apparatus for measuring a resist concentration of the washing liquid supplied from the liquid tank by the washing system; and
a washing state detector for detecting a washing state from the measured resist concentration.

4. A method for treating a tetraalkylammonium hydroxide-containing liquid, comprising, when concentrating a liquid to be treated containing tetraalkylammonium hydroxide by an evaporator,
concentrating the liquid to be treated at a concentration side by a reverse osmosis membrane device provided in a stage which is previous to the evaporator, and
washing a reverse osmosis membrane of the reverse osmosis membrane device using a virgin tetraalkylammonium hydroxide liquid and/or permeated water produced from the reverse osmosis membrane device according to clogging of the reverse osmosis membrane,
using a part of a system for treating the tetraalkylammonium hydroxide-containing liquid as a circulation system including the reverse osmosis membrane device, and
using the circulation system for the washing of the reverse osmosis membrane of the reverse osmosis membrane device by circulating the washing liquid containing tetraalkylammonium hydroxide in the circulation system,
the system for treating a tetraalkylammonium hydroxide-containing liquid further comprising
(a-2) a liquid tank retaining a tetraalkylammonium hydroxide-containing liquid,
(b-2) a liquid supply pipe having one end connected to a liquid discharge side of the liquid tank,
(c-2) a reverse osmosis membrane device connected to the other end of the liquid supply pipe,
(d-2) a concentrated water pipe having one end connected to a concentration side of the reverse osmosis membrane device and supplying concentrated water of the reverse osmosis membrane device to an evaporator,
(e-2) a concentrated water return pipe connected to the concentrated water pipe and supplying the concentrated water of the reverse osmosis membrane device to the liquid tank,
(f-2) a permeated water pipe having one end connected to a permeation side of the reverse osmosis membrane device,
(g-2) a permeated water tank provided in the middle of the permeated water pipe,
(h-2) a dilute tetraalkylammonium hydroxide effluent treatment facility connected to the other end of the permeated water pipe, and
(i-2) a permeated water return pipe connected to the permeated water pipe positioned between the permeated water tank and the dilute tetraalkylammonium hydroxide effluent treatment facility and supplying permeated water of the reverse osmosis membrane device to the liquid tank,
the method further comprising supplying the virgin tetraalkylammonium hydroxide liquid to the liquid tank and circulating the virgin tetraalkylammonium hydroxide liquid in both circulation systems of a circulation system formed by the (a-2) to (d-2) and (e-2) and a circulation system formed by the (a-2) to (c-2), (f-2), (g-2), and (i-2).

* * * * *